United States Patent
Sheets et al.

(10) Patent No.: US 11,180,380 B2
(45) Date of Patent: Nov. 23, 2021

(54) INLET FILTER AND METHOD OF USE

(71) Applicant: TEXAS EROSION SUPPLY, L.P., Wylie, TX (US)

(72) Inventors: Kyle Wayne Sheets, McKinney, TX (US); Brian Westbrook Ralph, Jr., Fate, TX (US)

(73) Assignee: Texas Erosion Supply, L.P., Wylie, TX (US)

( * ) Notice: Subject to any disclaimer, the term of this patent is extended or adjusted under 35 U.S.C. 154(b) by 0 days.

(21) Appl. No.: 16/831,606

(22) Filed: Mar. 26, 2020

(65) Prior Publication Data
US 2021/0300784 A1    Sep. 30, 2021

(51) Int. Cl.
| | |
|---|---|
| *E03F 5/04* | (2006.01) |
| *C02F 1/00* | (2006.01) |
| *B01D 39/16* | (2006.01) |
| *E03F 5/046* | (2006.01) |
| *C02F 103/00* | (2006.01) |

(52) U.S. Cl.
CPC .............. *C02F 1/004* (2013.01); *B01D 39/16* (2013.01); *E03F 5/0404* (2013.01); *E03F 5/046* (2013.01); *B01D 2239/0618* (2013.01); *C02F 2103/001* (2013.01); *C02F 2201/006* (2013.01)

(58) Field of Classification Search
CPC . E03F 6/0404; E03F 5/046; E03F 5/06; E03F 2005/063; E03F 2005/065; E03F 2005/066; E03F 5/0404
USPC ..... 210/162, 163, 170.03, 747.3; 404/2, 4, 5
See application file for complete search history.

(56) References Cited

U.S. PATENT DOCUMENTS

| | | | | |
|---|---|---|---|---|
| 2,473,279 | A | * | 6/1949 | Crocker .................. E03F 5/046 404/4 |
| 4,126,404 | A | * | 11/1978 | Ferns ........................ E03F 5/06 210/163 |
| 5,232,587 | A | * | 8/1993 | Hegemier ............... E03F 5/046 210/162 |

(Continued)

OTHER PUBLICATIONS

"Filtration Geotextiles—3.1 oz Nonwoven Lightweight Geotextiles for Drainage and Filteration", GEI Works <www.erosionpollution.com>, believed to be available at least as early as Mar. 25, 2020, 5 pages.

(Continued)

*Primary Examiner* — Christopher Upton
(74) *Attorney, Agent, or Firm* — Brandon V. Zuniga; James R. Gourley; Carstens & Cahoon, LLP

(57) ABSTRACT

An inlet filter and method of use are disclosed. In one aspect, the inlet filter comprises a frame, filter material, a feed stream inlet, and a filtrate outlet. The frame is configured so an exterior of the frame is shaped like a wedge. The frame comprises a thick portion and a narrow portion opposite the thick portion. The thick portion of the frame comprises the feed stream inlet. The filter material is positioned along a bottom surface of the frame and a portion of an upper surface of the frame that is opposite the feed stream inlet in the narrow portion of the frame. In another aspect, the method comprises inserting an inlet filter into a storm sewer inlet. The inlet filter can be one of a plurality of inlet filters inserted into the storm sewer inlet, the filters cooperating to filter a feed stream entering the storm sewer inlet.

29 Claims, 10 Drawing Sheets

(56) References Cited

U.S. PATENT DOCUMENTS

| | | | | |
|---|---|---|---|---|
| 5,405,539 | A | * | 4/1995 | Schneider ............. E03F 5/0404 210/163 |
| 6,010,622 | A | | 1/2000 | Chinn et al. |
| 6,709,579 | B1 | | 3/2004 | Singleton et al. |
| 6,811,708 | B2 | | 11/2004 | Shaw et al. |
| 6,974,540 | B1 | * | 12/2005 | Fleischmann ......... E03F 5/0404 210/163 |
| 7,074,326 | B2 | | 7/2006 | Singleton |
| 7,357,861 | B2 | * | 4/2008 | Kelley .................. E03F 5/0404 210/162 |
| 7,549,820 | B1 | * | 6/2009 | Happel ................. E03F 5/0404 210/163 |
| 7,922,916 | B1 | | 4/2011 | Wltt |
| 7,993,072 | B2 | * | 8/2011 | Lill ....................... E03F 5/0404 404/4 |
| 8,343,357 | B2 | * | 1/2013 | Horner .................. E03F 5/0404 210/747.3 |
| 8,388,835 | B2 | * | 3/2013 | Haschke ............... E03F 5/0404 210/162 |
| 9,963,865 | B2 | * | 5/2018 | Groff .................... E03F 5/0404 |
| 2017/0051491 | A1 | * | 2/2017 | Wilkie ................... E03F 5/046 |

OTHER PUBLICATIONS 3.5 oz Nonwoven Geotextile Liner—Light Weight Geotextile for Drainage and Filteration, GEI Works <www.erosionpollution.com>, believed to be available at least as early as Mar. 25, 2020, 4 pages.

Geotextile Materials Selection—Mesh and Micron Size Conversion Chart, GEI Works <www.erosionpollution.com>, believed to be available at least as early as Mar. 25, 2020, 6 pages.

TenCate Mirafi—Mirafi 135N Spec Sheet, 2011 TenCate Geosynthetics North America, believed to be available at least as early as Mar. 25, 2020, 1 page.

Woven Geotextile Fabrics FAQs—Woven Geotextile Fabric Questions, GEI Works <www.erosionpollution.com>, believed to be available at least as early as Mar. 25, 2020, 5 pages.

"D-Curb Bag", <http://www.dandyproducts.com/Products/DandyCurbBag.aspx>, believed to be available at least as Mar. 25, 2020, 1 page.

"Geocurve Stormwater Curb Inlet Filter" brochure, <https://www.geocurve.net/downloads.html>, believed to be available at least as early as Mar. 25, 2020, 2 pages.

"Geocurve Stormwater Curb Inlet Filter—Product Data Sheet", <https://www.geocurve.net/downloads.html>, believed to be available at least as early as Mar. 25, 2020, 2 pages.

"Gutter Guard Plus", 144 In. L, Yellow, Specifications, UltraTech International Inc.,<https://web.archive.org/web/20190529100353/https:/www.spillcontainment.com/products/gutter-guard-plus/>, believed to be available at least as early as Mar. 25, 2020, 3 pages.

"Ultra Curb Guard Plus", Complete Environmental Products, Inc., <https://web.archive.org/web/20190920122742/http:/www.cepsorbents.com/ultra-curb-guard-plus1>, believed to be available at least as early as Mar. 25, 2020, 2 pages.

"Ultra Curb Guards", UltraTech International Inc., <https://web.archive.org/web/20190529100327/https:/www.spillcontainment.com/products/curb-guards-insert-style/>, believed to be available at least as early as Mar. 25, 2020, 2 pages.

"Storm Drain Products", UltraTech International Inc., <https://web.archive.org/web/20190529095648/https:/www.spillcontainment.com/categories/stormwater-management/storm-drain-products/>, believed to be available at least as early as Mar. 25, 2020, 21 pages.

* cited by examiner

INLET FILTER AND METHOD OF USE

CROSS-REFERENCE TO RELATED APPLICATIONS

Not applicable.

BACKGROUND OF THE INVENTION

Technical Field

The present invention relates, for example, to a filter for an inlet to a storm water conduit. In some aspects, the present invention relates to a filter for a curb inlet to storm water conduit. Moreover, in some aspects, the present invention relates to a filter that is modular.

Description of Related Art

Some jurisdictions require construction sites to place filters at the inlet of curb-side storm drains to prevent debris, lose soil or other matter from flowing into a conduit for a storm water collection system.

Procedures for measuring the properties of filters are known and can be found in known test methods, for example ASTM D5261—10(2018), ASTM D4751—20, ASTM D4491/D4491M—17 available from ASTM international, which test methods are hereby incorporated by reference in their entirety as examples.

Existing options for filters, for example, bails of straw, rolls of a filter material, or bags full of sand or a filter material, include aspects that can be undesirable. For example, existing devices can lack the ability to remain installed in a storm sewer inlet for maintenance, lack modularity, lack the capability to easily fit storm drains having openings of different heights, widths and depths, lack desired ease of installation, lack the ability to intercept and retain smaller floatable debris, lack a combination of passing a high flow rate of water while retaining a high weight percentage of sediment over a selected size, lack an overflow outlet to reduce local flooding associated with heavy rain, lack the ability to retain a sufficient volume of material, lack the ability to intercept and retain smaller floatable material, lack the ability to provide a fit that is flush or nearly flush to an opening of a storm drain and thereby lack the ability to increase safety or decrease interference from pedestrian or automobile traffic, lack the ability to provide enhanced reduction of damage from contractors during development of a site protected by the filters, lack an enhanced ability to resist damage or UV degradation, lack desired durability, lack a desired strength, lack reusability, lack a reusable frame with a replaceable filter material, have a less than desirable life span, or have an undesirably high cost.

Accordingly, existing filters have undesirable characteristics and lack desirable features.

SUMMARY OF SELECTED EMBODIMENTS OF THE INVENTION

In accordance with a first embodiment, an inlet filter is provided. The inlet filter comprises a frame, filter material, a feed stream inlet, and a filtrate outlet. The feed stream inlet is configured to receive a feed stream, the feed stream comprising a fluid and solid materials carried by the fluid. The filtrate outlet is configured to discharge a filtrate stream comprising at least a portion of the fluid in the feed stream that passes through the filter material and any solid materials that pass through the filter material. The frame is configured so that an exterior of the frame is shaped like a wedge. The frame comprises a thick portion configured so that it is too thick to pass through a reference rectangle, and the frame comprises a narrow portion opposite the thick portion. The narrow portion of the frame is configured so that it is thin enough to be inserted into the reference rectangle. The thick portion of the frame comprises the feed stream inlet.

In accordance with a second embodiment, a method of using an inlet filter is provided. The method comprises inserting an inlet filter into a storm sewer inlet. The inlet filter comprises components, the components comprising: a frame, filter material, feed stream inlet, filtrate outlet and frame. The feed stream inlet is configured to receive a feed stream comprising a fluid and solid materials carried by the fluid. The filtrate outlet is configured to discharge at least a portion of a filtrate stream comprising fluid from the feed stream that passes through the filter material and any solid materials that pass through the filter material. The frame is configured so that an exterior of the frame is shaped like a wedge, the frame comprising a thick portion configured so that it is too thick to pass through a reference rectangle and the frame comprising a narrow portion opposite the thick portion, the narrow portion configured so that it is thin enough to be inserted into the reference rectangle. The thick portion of the frame comprises the feed stream inlet.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

FIG. 1 illustrates how a feed stream can enter the inlet filter, a filtrate stream can pass through a filter material and be discharged from the inlet filter to the storm sewer, a retentate can be retained by the inlet filter, and optionally, during an overflow condition, an elevated portion of the feed stream can be discharged to the storm sewer through an overflow outlet of the inlet filter without passing through the filter material.

DETAILED DESCRIPTION

In some embodiments, the inlet filters and methods described in the present application solve one or more problems or provide one or more advantages. For example, in some embodiments, the inlet filters have the ability to remain installed in a storm sewer inlet for maintenance, are modular, have the capability to easily fit storm drains having openings of different heights, widths and depths, have a desired ease of installation, have the ability to intercept and retain smaller floatable debris, pass a high flow rate of water while retaining a high weight percentage of sediment over a selected size, comprise an overflow outlet to reduce local flooding associated with heavy rain, have the ability to retain a sufficient volume of material (e.g., in an internal cavity of the inlet filter), have the ability to intercept and retain smaller floatable material, have the ability to provide a fit that is flush or nearly flush to an opening of a storm drain and thereby has the ability to increase safety or decrease interference from pedestrian or automobile traffic, have the ability to provide enhanced reduction of damage from contractors during development of a site protected by the filters, have an enhanced ability to resist damage or UV degradation, have desired durability, have a desired strength, are reusable, have a reusable frame with a replaceable filter material, have a desirable life span, have a sufficiently low cost, or any combination thereof.

Figure 1:
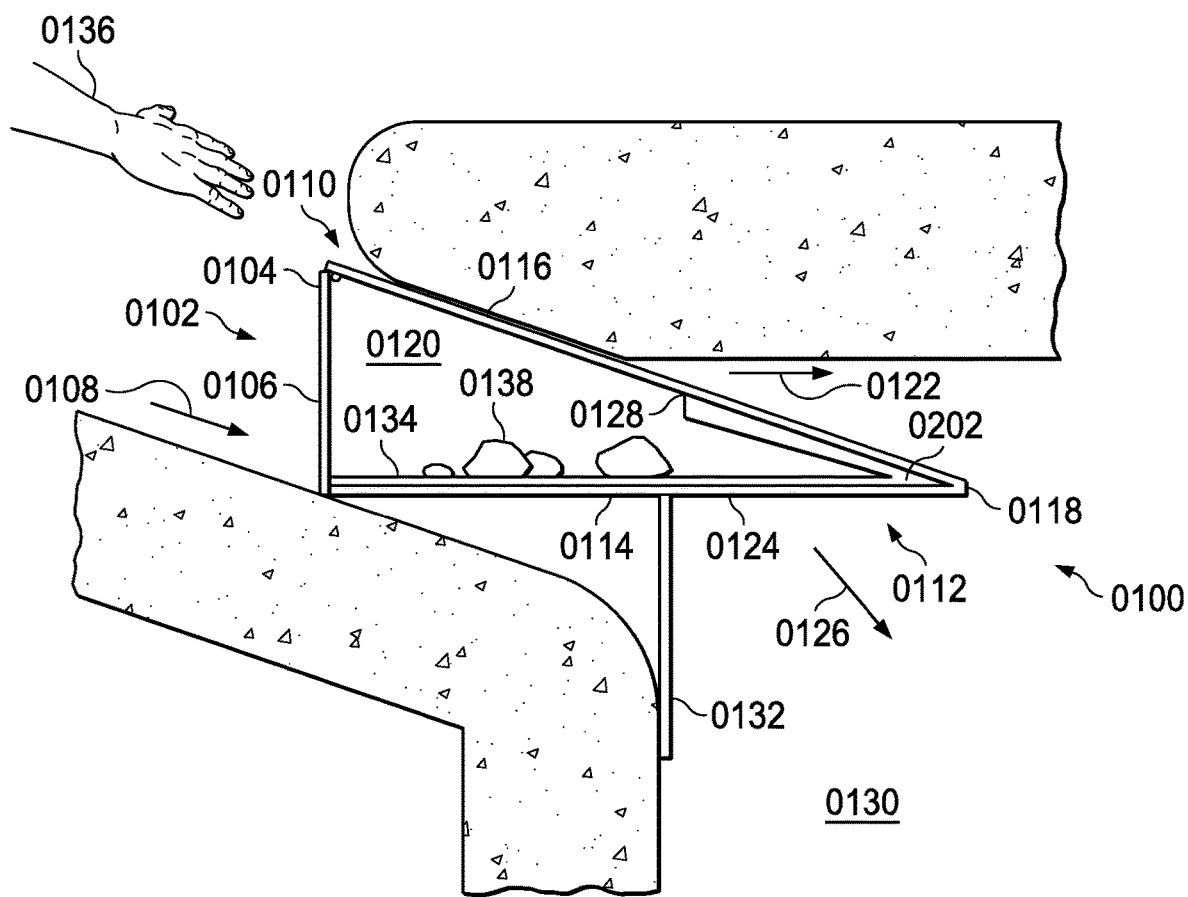
FIG. 1 is a schematic illustration from the right side of an embodiment of an inlet filter installed in a storm sewer inlet for a storm sewer.

Referring now to FIG. 1, an embodiment of an inlet filter 0100 for a storm sewer inlet 0102 will now be described. The inlet filter 0100 comprises a frame 0104, filter material 0202, a feed stream inlet 0106, and a filtrate outlet 0124. The feed stream inlet 0106 is configured to receive a feed stream 0108, the feed stream 0108 comprising a fluid and solid materials carried by the fluid. The filtrate outlet 0124 is configured to discharge a filtrate stream 0126 comprising at least a portion of the fluid in the feed stream 0108 that passes through the filter material 0202 and any solid materials that pass through the filter material 0202.

The frame 0104 is configured so that an exterior of the frame 0104 is shaped like a wedge, the frame 0104 comprising a thick portion 0110 configured so that it is too thick to pass through a reference rectangle 0802 and the frame 0104 comprising a narrow portion 0112 opposite the thick portion 0110. The narrow portion 0112 is configured so that it is thin enough to be inserted into the reference rectangle 0802. As illustrated, the thick portion 0110 of the frame 0104 comprises the feed stream inlet 0106.

The filter material 0202 can be positioned along a bottom surface 0114 of the frame 0104 and a portion of an upper surface 0116 of the frame 0104. The portion of the upper surface 0116 of the frame 0104 being positioned in the narrow portion 0112 of the frame 0104 and adjacent to an insertion end 0118 of the frame 0104. As illustrated, the insertion end 0118 of the frame 0104 can be positioned opposite the feed stream inlet 0106.

As illustrated with reference to FIG. 1, in some embodiments of an inlet filter 0100, the frame 0104 is configured to form an inner cavity 0120 within the frame 0104, and the inlet filter 0100 is configured to retain floatable solid materials in the inner cavity 0120.

In some embodiments of an inlet filter 0100, the inlet filter 0100 comprises an overflow outlet 0302, and the overflow outlet 0302 is configured to allow an elevated portion 0122 of the feed stream 0108 to be discharged from the inlet filter 0100 without passing through the filter material 0202. As illustrated in FIG. 1, the elevated portion 0122 of the feed stream 0108 comprises a portion of the feed stream 0108 at an elevation higher than the elevation of the top 0128 of the filter material 0202.

Figure 2:
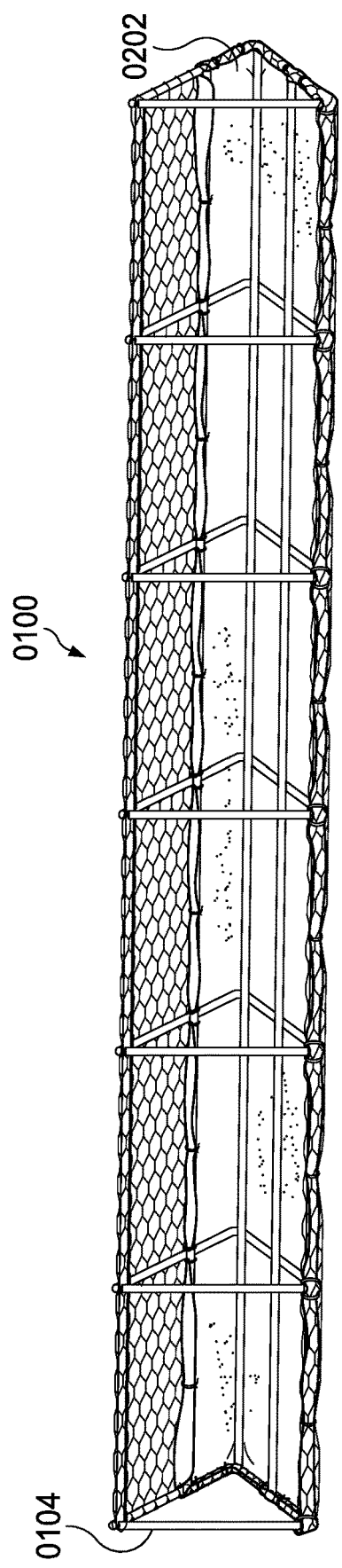
FIG. 2 is a schematic illustration from the front and right side of an embodiment of an inlet filter with a retention structure, for example, mesh, being used in conjunction with the frame.
Figure 4:
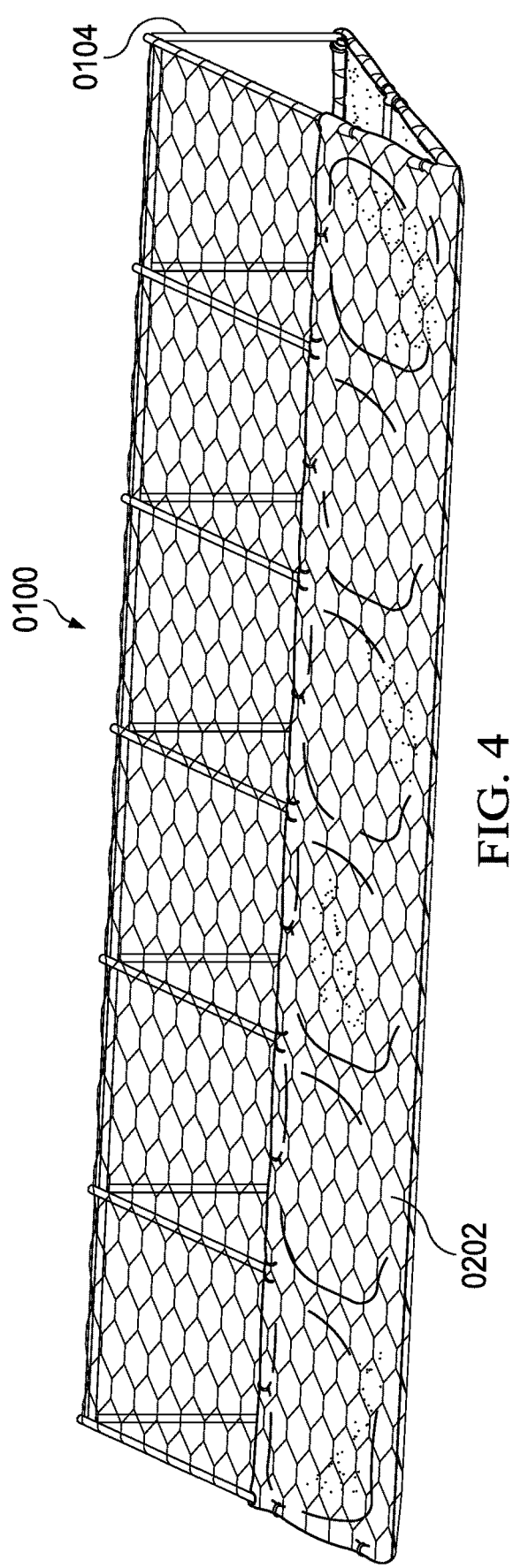
FIG. 4 is a schematic illustration from the rear, top and left of the inlet filter of FIG. 2.
Figure 3:
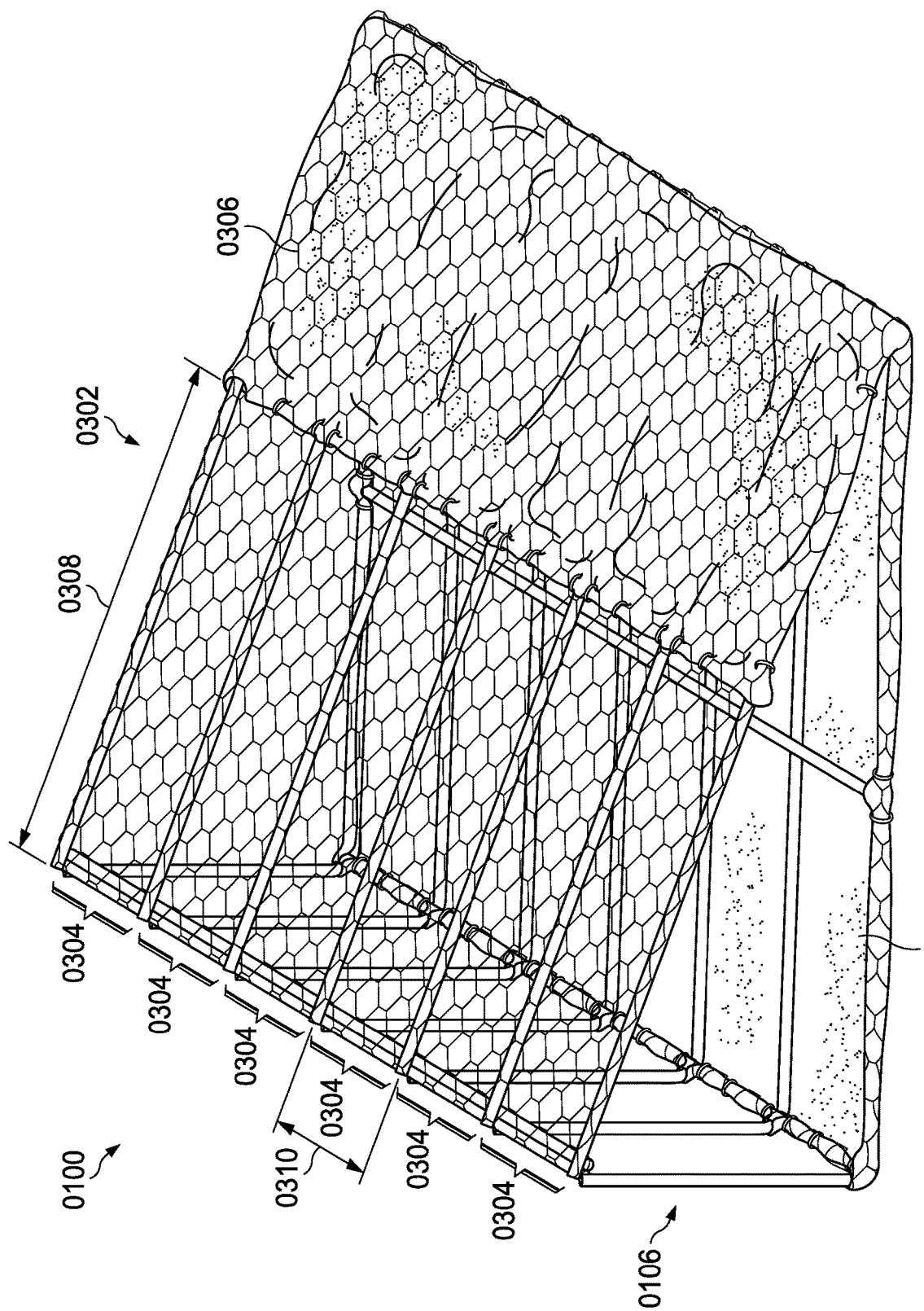
FIG. 3 is a schematic illustration from the right side, top and rear of the inlet filter of FIG. 2.
Figure 5:
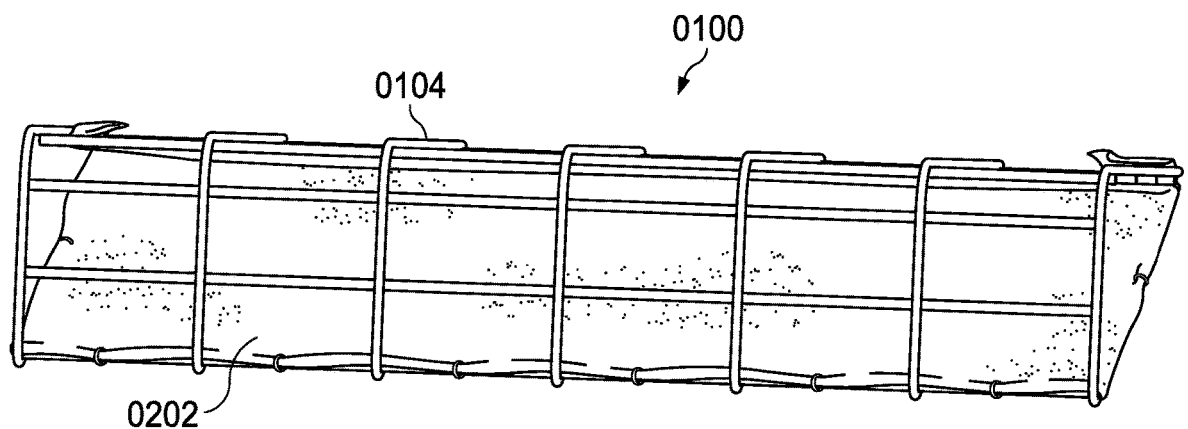
FIG. 5 is a schematic illustration from the front, top and right side of an embodiment of an inlet filter without a retention structure, for example, mesh, being used in conjunction with the frame.
Figure 6:
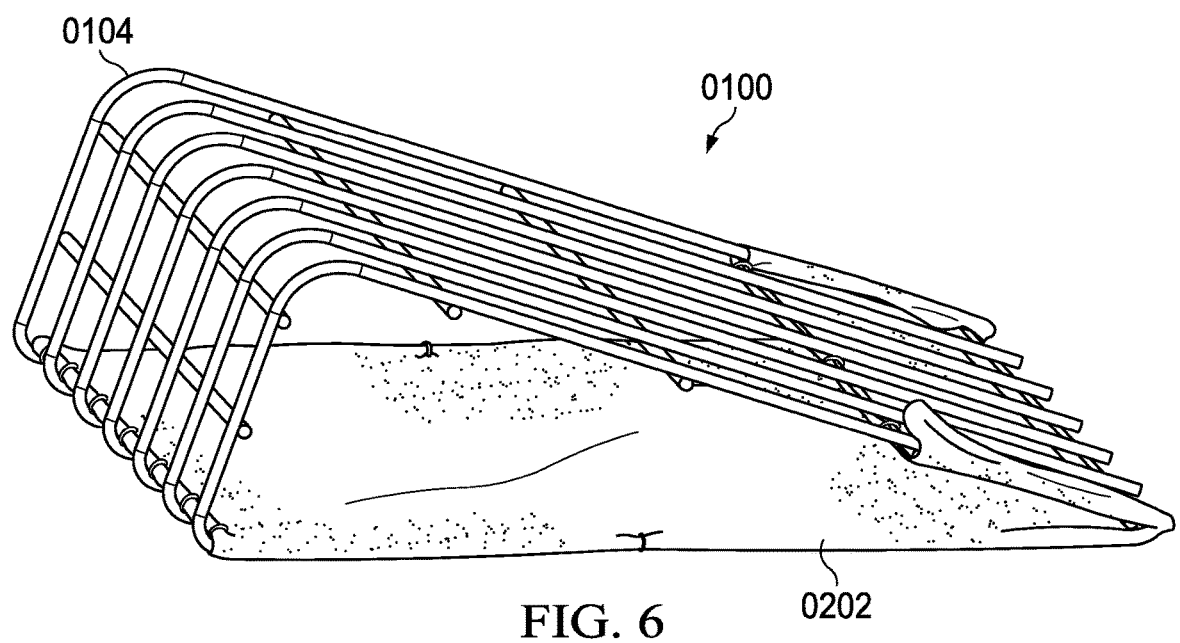
FIG. 6 is a schematic illustration from the right side, front and top of the inlet filter of FIG. 5.
Figure 7:
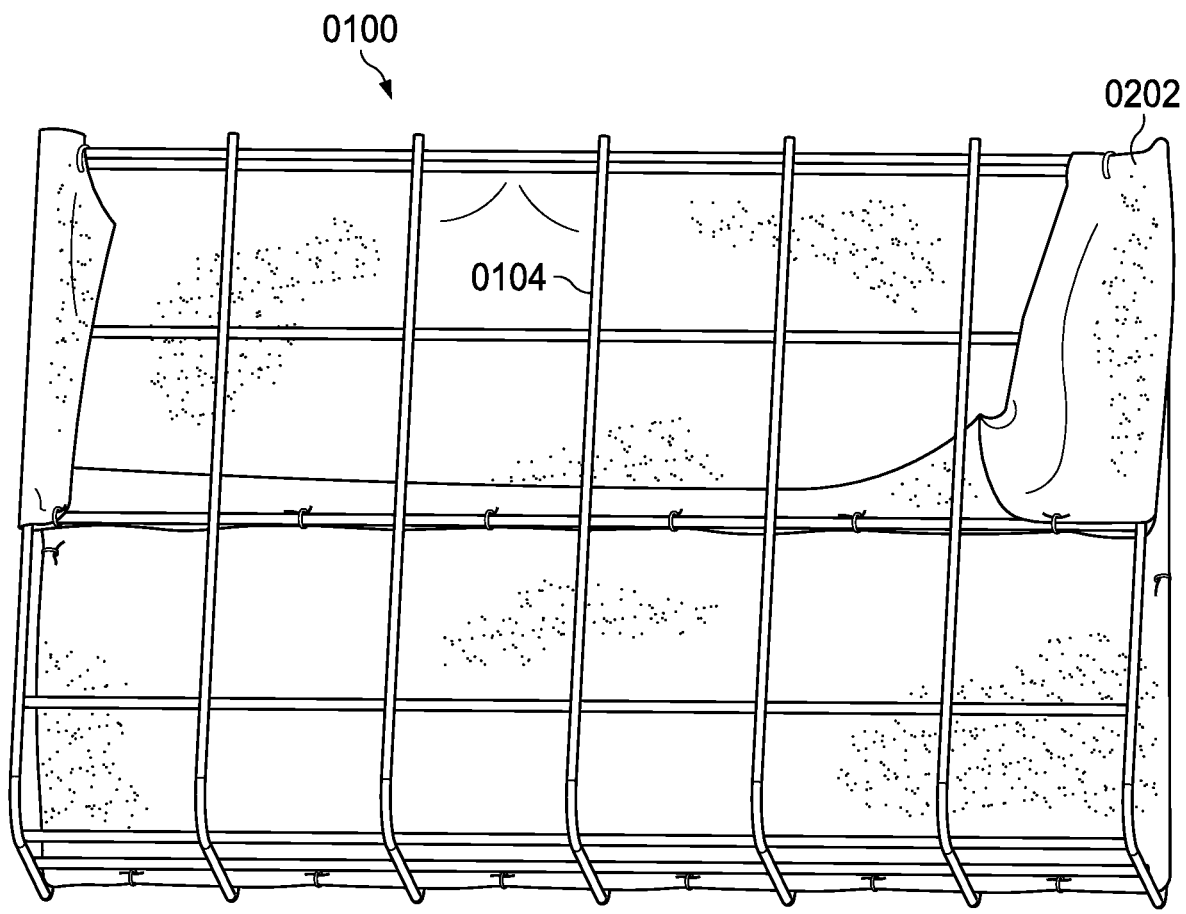
FIG. 7 is a schematic illustration from the top and slightly to the right of the inlet filter of FIG. 5.
Figure 11:
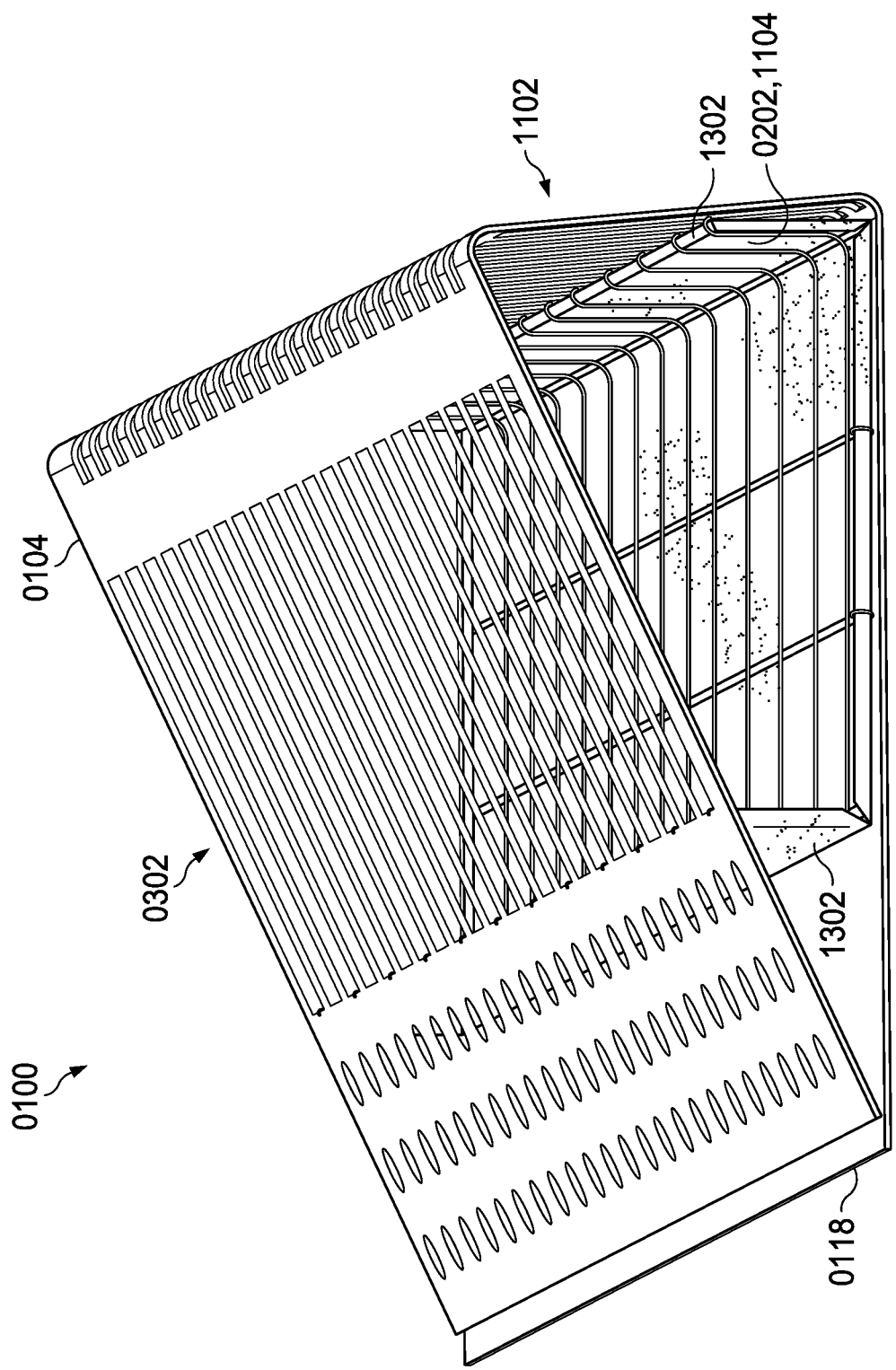
FIG. 11 is a schematic illustration from a left side, rear and top of the inlet filter of FIG. 10.

With reference to FIG. 11, in some embodiments of an inlet filter 0100, the inlet filter 0100 comprises an overflow inlet 1102, and the overflow inlet 0302 is configured to allow an elevated portion 0122 of the feed stream 0108 to enter the inlet filter 0100 without passing through any filter material 0202, 1104, 1302 at the feed stream inlet 0106 of the inlet filter 0100. As illustrated in FIG. 1, the elevated portion 0122 of the feed stream 0108 comprises a portion of the feed stream 0108 at an elevation higher than the elevation of the top of the filter material 0202 located at the feed stream inlet of the inlet filter 0100. Additionally, although FIG. 11 illustrates a raised ridge 1302 of filter material (e.g., at least partially vertically oriented filter material) at the feed stream inlet 0106 of the inlet filter and downstream of the inlet filter (e.g. toward an insertion end 0118 of the inlet filter, under the overflow outlet 0302, or a combination thereof), this is not required. The overflow inlet 1102, the filter material 0202, 1104 (e.g., at least partially vertically oriented filter material or a ridge of filter material) at the feed stream inlet 0106 (e.g. corresponding to and/or under the overflow inlet 1102), the overflow outlet 0302, or the filter material 0202, 1302 (e.g., at least partially vertically oriented filter material or a ridge of filter material) downstream of the feed stream inlet 0106 (e.g., corresponding to and/or under) the overflow outlet 0302 can all appear in a single embodiment, or can be used independently or in any desired combination. For example, in some embodiments, an overflow inlet, an overflow outlet or both can be used in conjunction with a finer mesh or screen formed from apertures in the frame, as opposed to filter material. This finer mesh or screen can have apertures smaller (e.g., by length, width, or area) than the apertures of the overflow inlet or the overflow outlet, respectively. With reference now to FIG. 3 specifically and FIGS. 2 to 4 more generally, in some embodiments of an inlet filter 0100, the frame 0104 comprises spaced apertures 0304, and the inlet filter 0100 comprises an object retention structure 0306, which is configured to retain floatable materials that enter the inlet filter 0100. In some embodiments, at least 50% and up to 100% by area of the spaced apertures of the object retention structure 0306 are smaller than an average size by area of the spaced apertures 0304 of the frame 0104.

With reference to FIG. 1, in some embodiments of an inlet filter 0100, the inlet filter 0100 is configured so that the filter material 0202 can be removed from the inlet filter 0100 and replaced with a replacement filter material 0202. In some embodiments, a user can remove the inlet filter though a storm sewer inlet while positioned beside a curb in which the storm sewer inlet is located. Additionally, in some embodiments, this can be accomplished without needing to open or enter a manhole corresponding to the storm sewer inlet.

Figure 8:
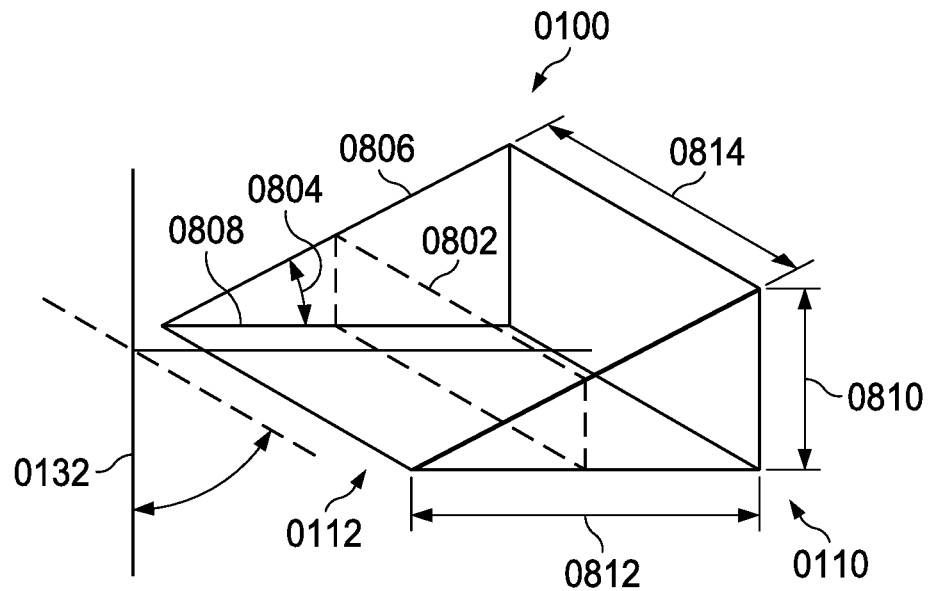
FIG. 8 is a schematic illustration of an inlet filter illustrating how a narrow portion of the inlet filter is thin enough to pass through a reference rectangle while a thick portion of the inlet filter is too thick to pass through the reference rectangle.

With reference to FIG. 8, in some embodiments of an inlet filter 0100, the exterior of the inlet filter 0100 is configured so that an angle 0804 between a top exterior surface 0806 of the inlet filter 0100 and a bottom exterior surface 0808 of the inlet filter 0100 is from 15 to 45 degrees or any value or range of values contained within the range from 15 to 45 degrees.

With reference to FIG. 3 specifically, and FIGS. 2 to 4 and FIGS. 5 to 7 more generally, in some embodiments of an inlet filter 0100, the frame 0104 comprises spaced apertures, and at least 50% and up to 100% by area of the spaced apertures 0304 of the frame 0104 have an aperture length 0308 and an aperture width 0310 equal to 6 to 8 inches, the aperture length 0308 of an aperture being the longest distance between any two points on the frame 0104 that bound the aperture, and the aperture width 0310 of the aperture being measured in a direction that is perpendicular to the aperture length 0308 and being measured between two points on the frame 0104 that bound the aperture.

In some embodiments of an inlet filter 0100, the inlet filter 0100 comprises an object retention structure 0306, the object retention structure 0306 is configured to retain floatable materials that enter the inlet filter 0100 and can pass through the spaced apertures 0304 in the frame 0104.

With reference again to FIG. 3, in some embodiments of an inlet filter 0100, the frame 0104 comprises spaced apertures 0304, and at least 50% and up to 100% by area of the spaced apertures 0304 have an aperture length 0308 and an aperture width 0310 equal to 1 to 5 inches, the aperture length 0308 of an aperture 0304 being the longest distance between any two points on the frame 0104 that bound the aperture 0304, and the aperture width 0310 being measured in a direction that is perpendicular to the aperture length 0308 and being measured between two points on the frame 0104 that bound the aperture 0304.

With reference now to FIG. 1, in some embodiments of an inlet filter 0100, the inlet filter 0100 comprises a filter cartridge 0134 configured to retain the filter material 0202. In some embodiments, the filter cartridge is configured so that the filter material 0202 can be replaced by a user 0136 while the inlet filter 0100 is positioned in an operational configuration, which is a configuration in which the inlet filter 0100 could operate if the filter material 0202 were operably installed to filter the feed stream 0108. In some embodiments, the filter cartridge 0134 is configured so that the filter material 0202 can be replaced by a user 0136 through the storm sewer inlet 0102 while the inlet filter 0100 is installed in the storm sewer inlet 0102.

As illustrated in FIG. 1, in some embodiments of an inlet filter 0100, the inlet filter 0100 comprises a lock 0132. The lock 0132 is configured to prevent removal of the inlet filter 0100 from the storm sewer inlet 0102 while the lock 0132 is in a locked configuration.

With further reference to FIG. 1, in some embodiments of an inlet filter 0100, the inlet filter 0100 is configured so that the inlet filter 0100 remains in an operative location at least partially in the storm sewer inlet 0102 while operating to filter the feed stream 0108 entering the storm sewer inlet 0102. For example, when it rains, water can rush into the storm sewer inlet and push against the inlet filter as the water is filtered. Nonetheless, the shape of the inlet filter, which is thicker toward one end and narrower toward the other end, will resist being pushed further into the storm sewer because the thicker portion of the inlet filter is too large to pass through the storm sewer inlet.

In some embodiments of an inlet filter 0100, the filter material 0202 comprises a non-woven geotextile fabric. Although, essentially any filter material can be used so that the size of particles or objects filtered by the filter material and the mass or volumetric flow rate of water flowing through an area of the filter material (e.g., the flux of water) can be tailored to desired specifications. To illustrate, in some embodiments, the filter material is a non-woven geotextile fabric that has a weight per area equal to 3.1 to 3.5 ounces per square yard. An examples is the Mirafi® 135N needlepunched nonwoven geotextile composed of polypropylene fibers that are formed into a stable network so the fibers retain their relative positions. The geotextile has a weight of 3.4 ounces per square yard, an apparent opening size of 0.30 mm (US Sieve #50) and a flow rate of 155 gallons per minute per square foot (gpm/ft^2). In some embodiments, the filter material is a monofilament fabric.

Now, with reference to FIG. 9, an embodiment of a method 0900 for using an inlet filter will now be described. The method can comprise two steps. A first step comprises inserting 0902 an inlet filter 0100 into a storm sewer inlet 0102. The optional second step, which can occur after the first step, comprises using 0904 the at least one inlet filter 0100 to filter a feed stream entering the storm sewer inlet 0102. The inlet filter can be any inlet filter described in this disclosure.

Figure 14:
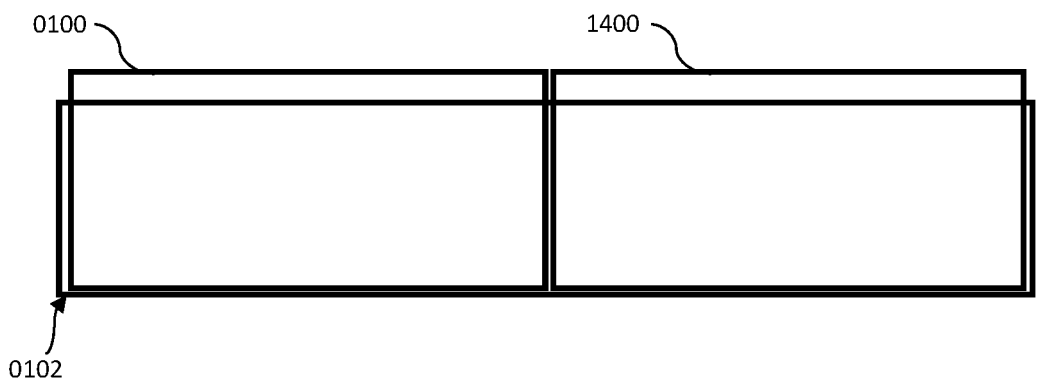
FIG. 14 depicts a schematic illustration of a plurality of inlet filters in a storm sewer inlet, the plurality of inlet filters comprising an inlet filter and an additional inlet filter.
Figure 15:
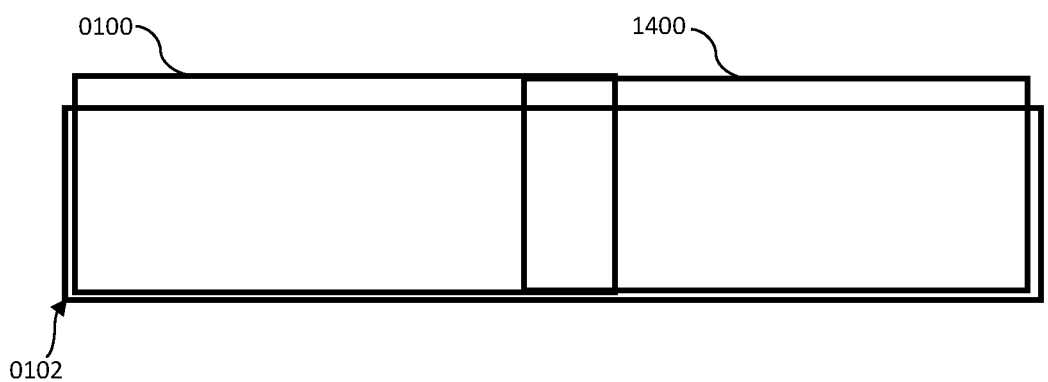
FIG. 15 depicts a schematic illustration of a first inlet filter and a second inlet filter that are configured to be capable of simultaneously (i) partially overlapping and (ii) cooperating to filter a feed stream to a storm sewer inlet.

In some embodiments, the method comprises inserting a plurality of inlet filters 0100 into the storm sewer inlet 0102. For example, as illustrated in FIG. 14, the step of inserting a plurality of inlet filters into the storm sewer inlet comprises the step of inserting 0902 the inlet filter 0100 into the storm sewer inlet 0102, and the plurality of inlet filters 0100 comprises the inlet filter 0100 (e.g., a first inlet filter 0100) and at least one additional inlet filter 0100 (e.g., additional inlet filter 1400 or second inlet filter 1400). In some embodiments, the inlet filter 0100 comprises specified components and each of the at least one additional inlet filter 0100 comprising corresponding components that correspond to the specified components of the inlet filter 0100. In other words, each of the inlet filters in the plurality of inlet filters can comprise all of the components and features of the inlet filter 0100. Moreover, the components of each of the plurality of the inlet filters can be configured (e.g., positioned, oriented, arranged relative to each other, or any combination thereof) as the components of the inlet filter 0100 are configured. Accordingly, it is evident that the inlet filter 0100 can be modular. For example, several of the inlet filters can be placed adjacent to each other, can be placed side-by-side (for example, as illustrated in FIG. 14), can partially overlap for example, as illustrated in FIG. 15), can be coupled together, connected or otherwise work together to filter a feed stream to a storm sewer inlet (for example, as illustrated in FIGS. 14 and 15. This can be especially helpful when one inlet filter is not wide enough to cover the entire inlet to a storm sewer inlet. It is also advantageous that the thickness 0810 (e.g., the thickness of a cross-section of the inlet filter (e.g., frame)) can decrease (e.g., gradually decrease) from the front (where the feed stream inlet is located) to the rear (which protrudes into the storm sewer inlet), which means that the inlet filter can be used with storm sewer inlets of different heights. Accordingly, the inlet filter has the ability to be stacked modularly with other inlet filters to be able to cover (or at least mostly or almost completely cover) the open area of storm sewer inlets with various heights and widths, and therefore filter (or at least mostly or almost completely filter), a feed stream (e.g., water and any solid objects carried by the water) entering the various storm sewer inlets. For example, in some embodiments, an inlet filter or a plurality of inlet filters working together can cover at least 50, 60, 70, 80, 90, 91, 92, 93, 94, 95, 96, 97, 98 or 99% and up to 100% by area of the open area of a storm sewer inlet.

With reference to FIG. 1 and FIG. 8, in some embodiments of a method of using the inlet filter, the inlet filter 0100 comprises a lock 0132, and the method comprises locking the lock 0132 of the inlet filter 0100 so that the inlet filter 0100 cannot be removed from the storm sewer inlet 0102. An example of a lock 0132 in a locked configuration is illustrated by the solid line in FIG. 8. The method can also comprise unlocking the lock 0132 of the inlet filter 0100 so that the inlet filter 0100 can be removed from the storm sewer inlet 0102. An example of a lock 0132 in an unlocked configuration is illustrated by the dashed line in FIG. 8.

Figure 9:
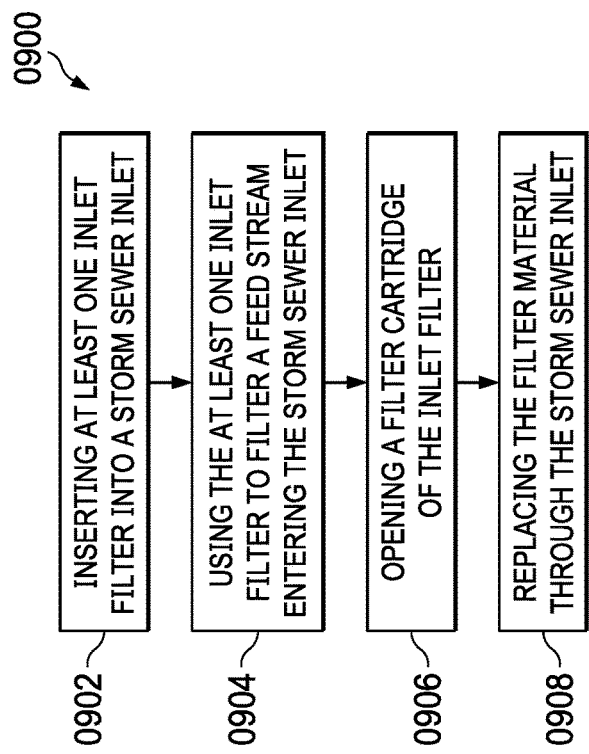
FIG. 9 is a schematic flow chart depicting an embodiment of a method for using at least one inlet filter.

With further reference to FIG. 1 and FIG. 9, in some embodiments of the method of using the inlet filter, the inlet filter 0100 comprises a filter cartridge 0134, and the filter cartridge retains the filter material 0202. The method can comprise opening 0906 the filter cartridge of the inlet filter 0100 and replacing 0908 the filter material 0202 through the storm sewer inlet 0102.

With reference again to FIG. 1 and FIG. 9, in some embodiments of the method of using the inlet filter, the method comprises using 0904 the inlet filter 0100 for filtering the feed stream 0108 entering the storm sewer inlet 0102. The filtering step can comprise several steps. A first step comprises using the feed stream inlet 0106 to receive the feed stream 0108, which comprises a fluid (e.g., storm water, solvents, industrial chemicals, automotive oil, gasoline, or any combination thereof) and the solid materials (e.g., debris, dirt, trash or any combination thereof) carried by the fluid.

A second step comprises using the filter material 0202 to filter the feed stream 0108, thereby providing the filtrate stream 0126 comprising the fluid and the solid materials that can pass through the filter material 0202 and a retentate 0138 comprising solid materials that cannot pass through the filter material 0202.

A third step comprises discharging the filtrate stream 0126.

A fourth step comprises retaining solid materials in the retentate 0138 in an inner cavity 0120 of the inlet filter 0100.

In some embodiments, the inlet filter 0100 can be configured so that during an overflow condition wherein the top of the feed stream 0108 is at an elevation above the top 0128 of the filter material 0202, the inlet filter 0100 discharges an elevated portion 0122 of the feed stream 0108 through at least one aperture 0304 in the inlet filter 0100. The elevated portion 0122 of the feed stream 0108 comprises a portion of the feed stream 0108 at an elevation higher than the elevation of the top 0128 of the filter material 0202. The at least one aperture 0304 can be configured to pass smaller objects in the solid materials (e.g., soil, bottle caps or a combination thereof) and retain larger objects (e.g., bottles) in the solid materials.

With reference to FIGS. 10-14, in some embodiments an inlet filter 0100 can comprise a frame and a removable filter cartridge 0134 that can be coupled to the frame 0104. As illustrated, the filter cartridge can be configured to retain a filter material 0202 in an operative configuration with respect to the inlet filter 0100. As can be seen, in some embodiments, the filter material 0202 can be located at the bottom of the inlet filter 0100. In some embodiments, a portion of the filter material (e.g., a ridge 1302 of filter material) can be configured to direct fluid in the feed stream through the filter material). In some embodiments, the entirety of the filter material can slope upwardly away from a feed stream inlet 0106 of the inlet filter. In some embodiments, a portion of the filter material (e.g., a ridge 1302 of filter material) can extend upwardly, for example, extending to an upper portion 0116 of the frame in a narrower portion 0112 of the frame at the rear of the inlet filter. The filter material can also extend upwardly at a feed stream inlet 0106 of the inlet filter. For example, this can be useful to retain solid materials (e.g., sediment, debris, smaller objects, larger objects, or any combination thereof) in the feed stream, for example, outside the inlet filter, at or adjacent to an entrance to the storm sewer inlet, or any combination thereof. In some embodiments, the filter material does not comprise a portion of the filter material that extends upwardly, but the inlet filter can nonetheless be configured so that the feed stream entering the inlet filter 0100 is directed through the filter material 0202, which can be retained by the inlet filter in a cartridge (optionally retained in an internal cavity of the inlet filter), and which cartridge can be removably coupled to the inlet filter. As a skilled person would understand upon reading this disclosure, various configurations of the inlet filter 0100 can be used to direct the fluid in a feed stream through the filter material when the inlet filter is not operating under an overflow condition.

Figure 10:
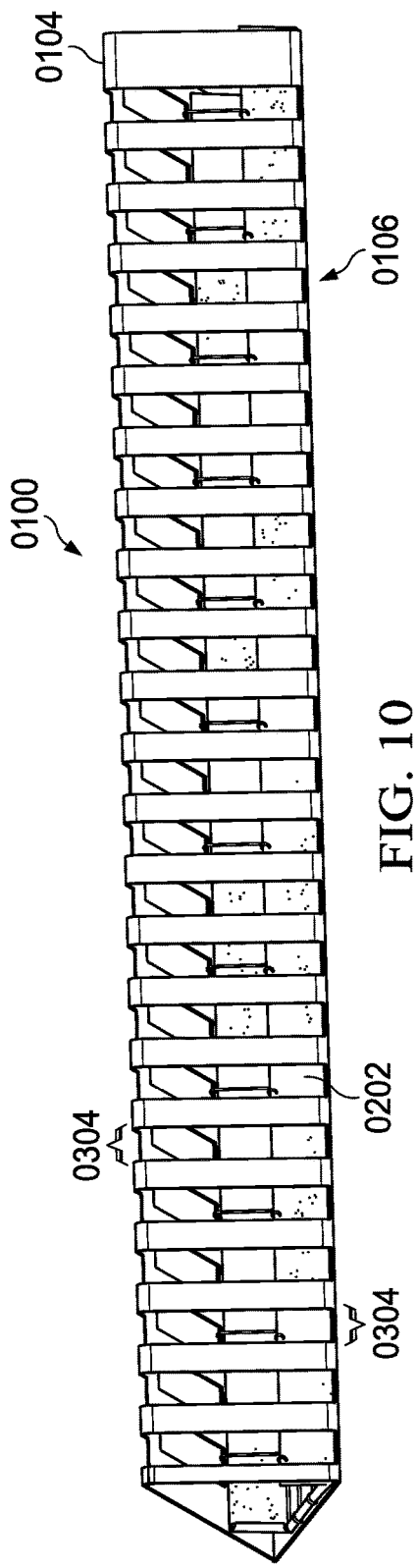
FIG. 10 is a schematic illustration from the front and left of an embodiment of an inlet filter comprising a frame made from metal (e.g., aluminum) having apertures.
Figure 12:
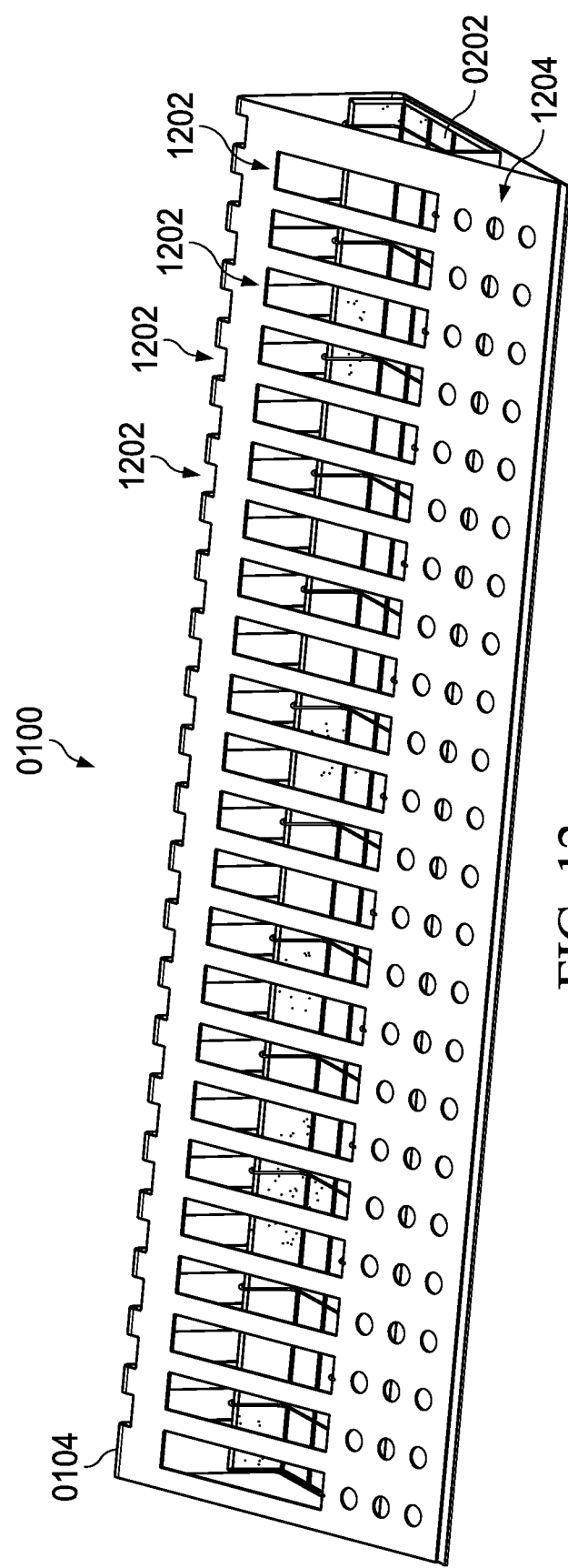
FIG. 12 is a schematic illustration from the top, rear and left of the inlet filter of FIG. 10.

With reference to FIG. 10 and FIG. 12, in some embodiments of an inlet filter (for example, in any embodiment of the inlet filter for which it is desired), the apertures 0304 in the frame can be offset. This can be useful to help direct the fluid in the feed stream through the filter material in the absence of an overflow condition, for example, as opposed to simply flowing through the inlet filter without passing through the filter material. As an example of offset apertures in the frame, the apertures forming a part of the feed stream inlet (e.g., at the front of the inlet filter) and the apertures forming a part of the filtrate outlet, the overflow outlet, or a combination thereof (e.g., apertures located rearwardly or downstream of the feed stream inlet) can be configured so that fluid (e.g., water) in a feed stream entering the filter through the feed stream inlet will flow into a blocking portion of the frame located rearwardly or downstream of the feed stream inlet if an overflow condition does not exist. This is in contrast to a design where the fluid in the feed stream that enters an aperture at the front of the inlet filter could flow straight through the inlet filter and out of an aperture toward the rear of the inlet filter without being filtered, even though an overflow condition does not exist. To provide a further example, the apertures in the front and rear of the frame can be configured so that for at least one aperture (e.g., one and only one, a plurality of apertures, at least a portion of the apertures by area, at least 50, 60, 70, 80, 90 and up to 100% of the apertures by area, each of the apertures, or any combination thereof) located at the front of the frame (e.g., where the feed stream inlet is located in the thicker portion of the frame), a straight line parallel to the bottom surface of the frame and extending from the front of the frame toward the rear of the frame (e.g., adjacent to the narrower portion of the frame) does not intersect an edge of the at least one aperture in the front of the frame and a corresponding edge of a corresponding aperture toward the rear of the frame. In additional embodiments, the inlet filter can comprise baffles, for example, to accomplish an effect similar to the effect of apertures in the front of the inlet filter being offset from apertures toward the rear of the inlet filter.

In some embodiments, the filtrate outlet of an inlet filter can be formed by at least one aperture in the frame (e.g., one and only one aperture or plurality of apertures adjacent to the filter material), at least one aperture (e.g., one and only one aperture or plurality of apertures adjacent to the filter material) in a filter cartridge, or a combination thereof. The apertures forming a part of the feed stream inlet (e.g., at the front of the inlet filter) can be relatively larger than at least some of the apertures that form a part of the overflow outlet. In some embodiments, some of the apertures forming a part of the overflow outlet are relatively larger apertures 1202 when compared to other relatively smaller apertures 1204 that form a part of the overflow outlet. In some embodiments of the inlet filter 0100, relatively higher apertures forming a part of the overflow outlet are relatively larger apertures 1202 when compared to relatively lower apertures (e.g., relatively smaller apertures 1204) that form a part of the overflow outlet. As an additional example, a relatively larger aperture can have a larger aperture 1202 length, aperture width, aperture area, or any combination thereof when compared to a relatively smaller aperture 1204. In some embodiments, the relatively larger apertures can be shaped like a rectangle (optionally rectangle with its longest side oriented vertically), the relatively smaller apertures can be shaped like a circle, or any combination thereof. In some embodiments of the inlet filter 0100, relatively higher apertures are relatively larger apertures 1202 when compared to relatively lower apertures (e.g., relatively smaller apertures 1204).

Figure 13:
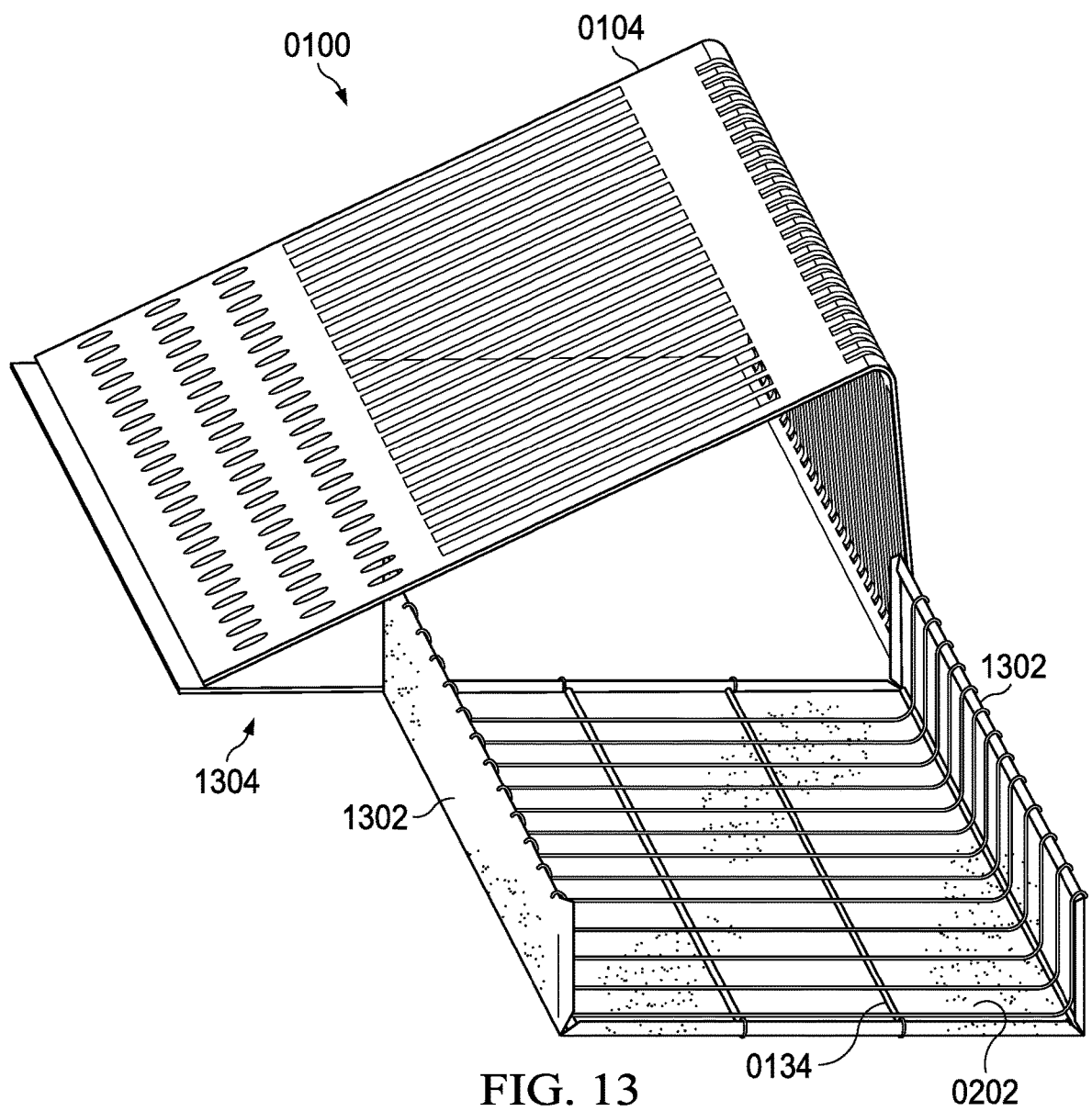
FIG. 13 is a schematic illustration from the left, rear and top of the inlet filter of FIG. 10, illustrating how a filter cartridge that retains a filter material can be removed from the inlet filter, for example, through an aperture in a side or both sides of the inlet filter, so that the filter material can be installed, removed, replaced, or any combination thereof.

FIG. 13 is a schematic illustration from the left and top of the inlet filter of FIG. 10, illustrating how a filter cartridge 0134 that retains a filter material 0202 can be removed from the inlet filter, for example, through an aperture 1304 in a side or apertures 1304 in both sides of the inlet filter 0100, so that the filter material 0202 can be installed, removed, replaced, or any combination thereof.

The frame and/or filter cartridge can be made from any suitable material. In some embodiments, the frame and/or filter cartridge can be made from a single sheet of material (e.g., metal, aluminium, a polymer, etc.) having at least one aperture 0304 (e.g., a plurality of apertures). When the sheet is made from metal (e.g., sheet metal), the metal can be perforated to form the apertures and folded to form the frame and/or filter cartridge. If the frame and/or filter cartridge is made from metal wire, the frame and/or filter cartridge can comprise apertures as a result of the spacing between wires that make up the frame and/or filter cartridge. If the frame and/or filter cartridge is made from any moldable material (e.g., metal, polymer, etc.), the frame and/or filter cartridge can be molded to have a desired shape comprising the at least one aperture (e.g., plurality of apertures).

ADDITIONAL EMBODIMENTS

The following clauses include descriptive embodiments that are offered as further support of the disclosed invention:

1. An inlet filter 0100, the inlet filter comprising:
a frame 0104;
filter material 0202;
a feed stream inlet 0106; and
a filtrate outlet 0124;
the frame configured so an exterior of the frame is shaped like a wedge;
the frame comprising a thick portion and a narrow portion opposite the thick portion;
the thick portion of the frame comprising the feed stream inlet;
the inlet filter configured so that a fluid in the feed stream is directed through the filter material;
the filter material (e.g., a portion of the filter material, most of the filter material, or all of the filter material) being positioned along a bottom surface of the frame;
inlet filter 0100 (e.g., configured to filter at least a portion of a feed stream 0108 that enters the inlet filter 0100, retain a retentate 0138 and discharge a filtrate stream 0126; optionally the retentate 0138 comprising solid materials that cannot pass through the inlet filter 0100, the filtrate stream 0126 comprising at least a portion of the fluid in the feed stream 0108 that passes through the filter material and any solid materials that pass through the filter material (e.g., dissolved solids, solids smaller than pores of the filter material, or any combination thereof), or any combination thereof);
the filter material (e.g., a portion of the filter material, less than half of the filter material, or all of the filter material) being positioned along a portion of an upper surface of the frame that is opposite the feed stream inlet in the narrow portion of the frame;
or
any combination thereof.

2. An inlet filter 0100 (e.g., for a storm sewer inlet 0102, the storm sewer inlet 0102 being located in a curb), (optionally the inlet filter 0100 comprising components), the inlet filter 0100 (or the components of the inlet filter 0100) comprising:
a frame 0104; and
filter material 0202 (e.g., configured to filter at least a portion of a feed stream 0108 that enters the inlet filter 0100, retain a retentate 0138 and discharge a filtrate stream 0126;
optionally the retentate 0138 comprising solid materials that cannot pass through the filter material 0202, the filtrate stream 0126 comprising at least a portion of the fluid in the feed stream 0108 that passes through the filter material 0202 and any solid materials that pass through the filter material 0202 (e.g., dissolved solids, solids smaller than pores of the filter material 0202 or any combination thereof), or any combination thereof);
the inlet filter 0100 comprising a feed stream inlet 0106, a filtrate outlet 0124, optionally an overflow inlet 1102 and optionally an overflow outlet 0302;
optionally, the frame 0104 being wedge-shaped.

3. The inlet filter 0100 of any preceding clause:
the feed stream inlet 0106 configured to receive a feed stream 0108 comprising a fluid and solid materials carried by the fluid;
the filtrate outlet 0124 configured to discharge at least a portion of a filtrate stream 0126 (e.g., some or all of the filtrate stream 0126, the filtrate stream 0126 comprising at least a portion of a filtrate stream 0126 comprising fluid in the feed stream 0108 that passes through the inlet filter 0100 (e.g., filter material 0202) and any solid materials that pass through the inlet filter 0100 (e.g., the filter material 0202 of the inlet filter 0100);

the filtrate outlet 0124 configured to discharge at least a portion of a filtrate stream 0126 comprising fluid in the feed stream 0108 that passes through the inlet filter 0100 (e.g., the filter material 0202) and any solid materials that pass through the inlet filter 0100 (e.g., the filter material 0202 of the inlet filter 0100);

the overflow outlet 0302 configured to allow an elevated portion 0122 of the feed stream 0108 to be discharged from the inlet filter 0100 without passing through the filter material 0202, the elevated portion 0122 of the feed stream 0108 comprising a portion of the feed stream 0108 at an elevation higher than the elevation of the top 0128 of the filter material 0202;

the feed stream inlet 0106 comprising a frame feed stream opening in the frame 0104;

the filtrate outlet 0124 comprising a frame 0104 filtrate opening in the frame 0104;

the overflow outlet 0302 comprising a frame 0104 overflow opening;

the feed stream inlet 0106 (e.g., frame feed stream opening) configured to cover at least a portion (e.g., at least 1, 2, 3, 4, 5, 6, 7, 8, 9, 10, 20, 30, 40, 50, 60, 70, 80, 90, 91, 92, 93, 94, 95, 96, 97, 98 or 99 wt. % and up to 100 wt. % by area) of the cross-sectional area of the storm sewer inlet 0102, optionally, the cross-sectional area is taken in a plane parallel to a feed inlet surface of the frame 0104 that comprises the frame feed stream opening; optionally the cross-sectional area taken in a direction perpendicular to the average direction by mass flow rate from which fluid is intended to flow into the storm sewer inlet 0102, the inlet filter 0100, or a combination thereof;

the feed stream inlet 0106 (e.g., frame feed stream opening) configured to receive at least a portion (e.g., at least 1, 2, 3, 4, 5, 6, 7, 8, 9, 10, 20, 30, 40, 50, 60, 70, 80, 90, 91, 92, 93, 94, 95, 96, 97, 98 or 99 wt. % and up to 100 wt. % by mass or volumetric flow rate) of a feed stream 0108 flowing into a storm sewer inlet 0102;

the frame 0104 being configured so that an exterior (e.g., the external surfaces) of the frame 0104 is wedge-shaped (e.g., shaped like a wedge, shaped like the exterior of a triangular prism, or any combination thereof), the frame 0104 (e.g., the shape of the wedge) comprising a thick portion 0110 configured so that it is too thick to pass through a reference rectangle 0802 (e.g., corresponding to the storm sewer inlet 0102) or the storm sewer inlet 0102 (e.g., configured to be too thick to pass through a reference rectangle 0802, which can be the size of the storm sewer inlet 0102; configured to have a thickness 0810 (e.g., maximum thickness) that is greater than the distance between opposite inner surfaces of the storm sewer inlet 0102; configured to be retained by, restricted by, secured relative to, immobilized relative to, fixed in position relative to, or lodged in the storm sewer inlet 0102, or any combination thereof; or configured to be retained by opposite inner surfaces of, secured relative to, immobilized relative to, fixed in position relative to, or lodged in the storm sewer inlet 0102, or any combination thereof; or any combination thereof), and the frame 0104 comprising a narrow portion 0112 opposite the thick portion 0110, the narrow portion 0112 configured so that it is thin enough to be inserted into the reference rectangle 0802 (e.g., corresponding to the storm sewer inlet 0102) or the storm sewer inlet 0102 (e.g., configured to be too thin enough to pass through the reference rectangle 0802; configured to have a thickness 0810 (e.g., maximum thickness) that is equal to or less than the distance between opposite inner surfaces of the storm sewer inlet 0102; configured to be able to pass through the storm sewer inlet 0102; configured to pass through or between opposite inner surfaces of the storm sewer inlet 0102; or any combination thereof); the reference rectangle 0802 being perpendicular to a bottom surface of the inlet filter (e.g., frame); the reference rectangle 0802 being parallel to an entrance surface of the inlet filter (e.g., frame) where the feed stream inlet 0106 is located; the reference rectangle 0802 being parallel to a bottom of entrance surface of the inlet filter (e.g., frame) where the feed stream inlet 0106 is located; the reference rectangle 0802 being vertical when the bottom surface of the inlet filter (e.g., frame) is horizontal; or any combination thereof;

the inlet filter (e.g., frame) having a length 0812 (e.g., maximum length) equal to 48 inches, equal to at least 6, 12, 18, 24, 36, 48, 54, 60, 72, or 84 inches, no more than 12, 18, 24, 36, 48, 54, 60, 72, 84 or 96 inches, or any combination thereof;

the inlet filter (e.g., frame) having a width 0814 (e.g., maximum width) equal to 14 inches, equal to at least 6, 12, 18, 24, 36, 48, 54, 60, 72, 84, 96, 108, or 120 inches, no more than 12, 18, 24, 36, 48, 54, 60, 72, 84, 96, 108, 120 or 132 inches, or any combination thereof;

the inlet filter (e.g., frame) having a thickness 0810 (e.g., maximum thickness) equal to 7.5 inches, equal to at least 3.5, 4.5, 5.5, 6.5, 7.5, 8.5, 9.5, 10.5, 11.5, 12.5, or 13.5 inches, no more than 4.5, 5.5, 6.5, 7.5, 8.5, 9.5, 10.5, 11.5, 12.5, 13.5 or 14.5 inches, or any combination thereof;

the length 0812 (e.g., maximum length, for example, for any shape with a length that varies) of the inlet filter (e.g., frame) being: the longest distance between any two points on the bottom surface of the inlet filter (e.g., frame) in a direction that the inlet filter is configured to be inserted into the storm sewer inlet (e.g., a direction from the thick portion of the frame toward the narrow portion of the frame); measured in a horizontal plane when the bottom surface of the inlet filter is oriented horizontally; the longest distance between any two points on the inlet filter (e.g., frame) in a direction that is parallel to one or both planes tangent to either or both sides of the inlet filter (e.g., frame); the longest distance between any two points on the inlet filter (e.g., frame) in a direction that is parallel to a bisection plane that bisects the angle between a plane tangent to the left side of the inlet filter (e.g., frame) and a frame tangent to the right side of the inlet filter; the longest distance between any two points on the inlet filter (e.g., frame) in a direction that the inlet filter is configured to be inserted into the storm sewer inlet (e.g., a direction from the thick portion of the frame toward the narrow portion of the frame); the longest distance between any two points on the inlet filter (e.g., frame) in a direction that is perpendicular to an entrance surface of the inlet filter (e.g., frame) where the feed stream inlet is located (e.g., a direction from the thick portion of the frame toward the narrow portion of the frame); measured in a horizontal plane while the inlet filter is in use; or any combination thereof;

the thickness 0810 being: the height of a cross-section of the inlet filter (e.g., frame); the cross-section being oriented in a direction perpendicular to the length (e.g., maximum length) of the inlet filter (e.g., frame); the height of the cross-section of the inlet filter (e.g., frame) measured from a bottom surface of the inlet filter (e.g., frame) in a vertical direction where the height is being measured while the bottom surface of the inlet filter (e.g., frame) rests on a horizontal surface); the height of the cross-section of the inlet filter (e.g., frame) as measured from a bottom surface of the inlet filter (e.g., frame) in a direction perpendicular to the bottom surface where the height is being measured; or any combination thereof;

the width 0814 (e.g., maximum width, for example, for any shape with a width that varies) of the inlet filter (e.g., frame) being the longest distance between any two points on the inlet filter (e.g., frame frame) as measured: in a direction that is perpendicular to the length of the inlet filter and the thickness of the inlet filter; in a direction that is perpendicular to a length of the inlet filter (e.g., frame); from one side to an opposite side of the inlet filter (e.g., frame); in a direction parallel to the entrance surface of the inlet filter (e.g., frame) where the feed stream inlet is located; in a direction that is parallel to the bottom of the inlet filter (e.g., frame); in a direction that is horizontal and being measured while the inlet filter is in use; in a horizontal plane when the bottom surface of the inlet filter is oriented horizontally; or any combination thereof;

the frame 0104 being configured to form an inner cavity 0120 within the frame 0104;

the thick portion 0110 of the frame 0104 comprising a feed stream inlet 0106 (e.g., the feed stream inlet 0106), the feed stream inlet 0106 comprising at least one opening;

the feed stream inlet 0106 being configured to permit a fluid and solids (e.g., soil, debris, construction materials or any combination thereof) carried by the fluid (e.g., water, rain, chemicals, solvents, oil, or any combination thereof) to flow into the at least one opening;

the thick portion 0110 of the frame 0104 is adjacent to a feed inlet end of the frame 0104;

the thin portion of the frame 0104 is adjacent to an insertion end 0118 of the frame 0104 (e.g., configured to be inserted into the storm sewer inlet 0102);

the insertion end 0118 of the frame 0104 is opposite the feed inlet end of the frame 0104;

the filter material 0202 being coupled (e.g., removably coupled, removably fixed, removably attached or any combination thereof) to the frame 0104, the filter material 0202 configured to permit the fluid to pass through the filter material 0202 (e.g., so that the fluid can pass through the inlet filter 0100, through the storm sewer inlet 0102, into a downstream portion of the storm sewer 0130, or any combination thereof), the filter material 0202 configured to retain solids larger than a specific size;

the filter material 0202 being positioned within the frame 0104;

the frame 0104 comprising a bottom, the bottom surface 0114 of the frame 0104 comprising the filter material 0202;

the frame 0104 comprising an upper surface, the upper surface 0116 of the frame 0104 being adjacent to an insertion end 0118 of the frame 0104, the insertion end 0118 of the frame 0104 being opposite the feed stream inlet 0106, the upper surface 0116 of the frame 0104 comprising the filter material 0202;

the filter material 0202 being positioned along a bottom surface 0114 of the frame 0104 and an upper surface 0116 of the frame 0104, the upper surface 0116 of the frame 0104 being adjacent to an insertion end 0118 of the frame 0104, the insertion end 0118 of the frame 0104 (e.g., positioned in the narrow portion 0112 of the frame 0104) being opposite the feed stream inlet 0106;

the filter material 0202 being positioned along a bottom surface 0114 of the frame 0104 and a portion of an upper surface 0116 of the frame 0104, the portion of the upper surface 0116 of the frame 0104 being positioned in the narrow portion 0112 of the frame 0104 and adjacent to an insertion end 0118 of the frame 0104, the insertion end 0118 of the frame 0104 (e.g., positioned in the narrow portion 0112 of the frame 0104) being opposite the feed stream inlet 0106;

the filter material 0202 being positioned along a bottom surface 0114 of the frame 0104 and an upper surface 0116 of the frame 0104 adjacent to the insertion end 0118 of the frame 0104 (e.g., positioned in the narrow portion 0112 of the frame 0104); or any combination thereof.

4. The inlet filter 0100 of any preceding clause:

the inlet filter 0100 comprising an object retention structure 0306 (e.g., mesh structure);

the object retention structure 0306 configured to retain floatable materials that enter the inlet filter 0100;

the object retention structure 0306 configured to hold or retain the filter material 0202 against the frame 0104;

the object retention structure 0306 (e.g., mesh structure) comprising, consisting essentially of, consisting of or being made of metal, metal alloy, wire, fiber, rope, cable, polymer, netting or any combination thereof (e.g., metal wire or 22 gauge metal wire netting, for example, which can be used for poultry netting);

the object retention structure 0306 (e.g., mesh structure) comprising spaced apertures, at least one, at least 50%, 60, 70, 80, or 90% and up to 100% of the spaced apertures of the object retention structure 0306 by area, some of or all of the spaced apertures of the object retention structure 0306 or on average the spaced apertures of the object retention structure 0306 having a smaller cross-sectional open area, a smaller aperture length 0308, a smaller aperture width 0310, or any combination thereof, when compared to at least one, the smallest, the largest, some of or all of the spaced apertures 0304 of the frame 0104 or the spaced apertures 0304 of the frame 0104 on average;

the frame 0104 comprising spaced apertures; the inlet filter 0100 comprising an object retention structure 0306; the object retention structure 0306 configured to retain floatable materials that enter the inlet filter 0100; at least 50% and up to 100% by area of the spaced apertures of the object retention structure 0306 are smaller than the average size of the spaced apertures 0304 of the frame 0104; or any combination thereof;

the object retention structure 0306 (e.g., mesh structure) comprising spaced apertures, and at least one, at least 50, 60, 70, 80 or 90% and up to 100% of the spaced apertures by area, a plurality of or all of the spaced apertures or the spaced apertures on average have a cross-sectional open area of 9 square inches, or at least 6, 7, 8, 9, 10, 11, 12, or 13 square inches, no more than 7, 8, 9, 10, 11, 12, 13 or 14 square inches, or any combination thereof;

the object retention structure 0306 (e.g., mesh structure) comprising spaced apertures, and at least one, at least 50, 60, 70, 80 or 90% and up to 100% of the spaced apertures by area, a plurality of or all of the spaced apertures have an aperture length 0308 of 3 inches, or at least 1, 2, 3, 4, or 5 inches, or no more than 2, 3, 4, 5 or 6 inches, or any combination thereof, the aperture length 0308 of an aperture being the longest distance between any two points on the object retention structure 0306 (e.g., mesh structure) that bound the aperture;

the object retention structure 0306 (e.g., mesh structure) comprising spaced apertures, and at least one, at least 50, 60, 70, 80 or 90% and up to 100% of the spaced apertures by area, a plurality of or all of the spaced apertures have an aperture width 0310 of 3 inches, or at least 1, 2, 3, 4, or 5 inches, or no more than 2, 3, 4, 5 or 6 inches, or any combination thereof, the aperture width 0310 of an aperture being measured in a direction that is perpendicular to the aperture length 0308 and being measured between two points on the object retention structure 0306 (e.g., mesh structure) that bound the aperture;

a portion of the filter material 0202 is positioned (e.g., clamped, fixed, squeezed, sandwiched or any combination thereof) between the frame 0104 and the object retention structure 0306;

the filter material 0202 comprises one and only one continuous piece of material;

the filter material 0202 comprises a plurality of pieces of material;

the filter material 0202 is configured to extend across at least 50, 60, 70, 80, 90, 91, 92, 93, 94, 95, 96, 97, 98, 99 or 100% of a bottom surface area of the frame 0104, the inlet filter 0100 being configured so that the bottom surface area is located at the bottom surface 0114 of the frame 0104 when the frame 0104 is installed in the storm sewer inlet 0102;

the inlet filter 0100 configured so that during an overflow condition wherein the top of the feed stream 0108 is at an elevation above the top 0128 of the filter material 0202, the inlet filter 0100 discharges an elevated portion 0122 of the feed stream 0108 through at least one aperture 0304 in the inlet filter 0100, the elevated portion 0122 of the feed stream 0108 comprising a portion of the feed stream 0108 at an elevation higher than the elevation of the top 0128 of the filter material 0202, optionally the at least one aperture 0304 configured to pass smaller objects in the solid materials and retain larger objects in the solid materials;

the inlet filter 0100 comprises an overflow outlet 0302, optionally the overflow outlet 0302 is configured to permit water that enters the inlet entrance to exit the frame 0104 without passing through the filter material 0202 when an overflow condition exists, the overflow condition occurring when the fluid level of a fluid entering the inlet entrance is at a higher elevation than the top 0128 of the filter material 0202;

the inlet filter 0100 is configured so that the filter material 0202 extends from the bottom surface 0114 of the frame 0104 and up to the bottom of an overflow outlet 0302 of the inlet filter 0100, optionally the bottom of the overflow outlet 0302 is at least 2 inches vertically down from the top of the frame 0104 when the bottom surface 0114 of the frame 0104 is resting on a horizontal surface;

the inlet filter 0100 is configured so that the inlet filter comprises an overflow outlet 0302 above the filter material 0202 or above and adjacent to the filter material, the overflow outlet comprising at least one aperture (e.g., one and only one aperture, at least two apertures, a plurality of apertures, or a combination thereof) that is at least 1, 2 or 3 inches high, no more than 6, 5, 4, 3 or 2 inches high; or a combination thereof;

the inlet filter 0100 is configured so that the inlet filter comprises an overflow outlet 0302 above the filter material 0202; the overflow outlet configured to prevent the inlet filter from clogging, for example, due to excess sediment, debris, floatables or any combination thereof; optionally as a result of the excess sediment, debris, floatables or any combination thereof attaching to the feed stream inlet of the inlet filter, entrance surface of the inlet filter, front of the inlet filter, or any combination thereof; optionally thereby preventing flooding or pooling of stormwater, for example, at or adjacent to the storm sewer inlet, the inlet filter, or any combination thereof;

the inlet filter 0100 is configured so that the filter material 0202 can be removed from the inlet filter 0100 and replaced with a replacement filter material 0202; or any combination thereof;

5. The inlet filter 0100 of any preceding clause:

the exterior of the inlet filter 0100 is configured so that an angle 0804 between the top exterior surface 0806 of the inlet filter 0100 and the bottom exterior surface 0808 of the inlet filter 0100 is 30 degrees, or at least 15, 20, 25, 30, 35, 40 or 45 degrees, no more than 20, 25, 30, 35, 45 or 50 degrees, or any combination thereof;

the exterior of the inlet filter 0100 is configured so that a vertical cross-section of the wedge-shape of the frame 0104, the cross-section extending from the thick portion 0110 of the frame 0104 to the narrow portion 0112 of the frame 0104, is a right triangle with the top of the frame 0104 being the hypotenuse of the right triangle; or any combination thereof.

6. The inlet filter 0100 of any preceding clause:

the inlet filter 0100 comprising an object retention structure 0306 (e.g., mesh structure) configured to retain floatable solid materials that can pass through the frame 0104;

the inlet filter 0100 comprising an object retention structure 0306 (e.g., mesh structure) configured to maintain the filter material 0202 in an operational configuration, optionally when the filter material 0202 is in the operational configuration, the filter material 0202 is positioned to filter a fluid passing through the frame 0104, positioned adjacent to the frame 0104, positioned between the frame 0104 and the object retention structure 0306, or any combination thereof;

the frame 0104 comprising spaced apertures, and the inlet filter 0100 comprising an object retention structure 0306, the object retention structure 0306 (e.g., mesh structure) comprising spaced apertures, at least one, at least 50%, 60, 70, 80, or 90% and up to 100% of the spaced apertures of the object retention structure 0306 by area, some of or all of the spaced apertures of the object retention structure 0306 or on average the spaced apertures of the object retention structure 0306 having a smaller cross-sectional open area, a smaller aperture length 0308, a smaller aperture width 0310, or any combination thereof, when compared to at least one, the smallest, the largest, some of or all of the spaced apertures 0304 of the frame 0104 or the spaced apertures 0304 of the frame 0104 on average;

the frame 0104 comprising spaced apertures, and at least one, at least 50, 60, 70, 80 or 90% and up to 100% of the spaced apertures by area, a plurality of or all of the spaced apertures or the spaced apertures on average have a cross-sectional open area of 36 square inches, or at least 15, 20, 25, 30, 35, 40, 45 or 50 square inches, no more than 20, 25, 30, 35, 40, 45, 50 or 55 square inches, or any combination thereof;

the frame 0104 comprising spaced apertures, and at least one, at least 50, 60, 70, 80 or 90% and up to 100% of the spaced apertures by area, a plurality of or all of the spaced apertures have an aperture length 0308 of 6 inches, or at least 4, 5, 6, 7, 8, 9, 10, 11 or 12 inches, or no more than 5, 6, 7, 8, 9, 10, 11, 12 or 13 inches, or any combination thereof, the aperture length 0308 of an aperture being the longest distance between any two points on the frame 0104 that bound the aperture;

the frame 0104 comprising spaced apertures, and at least one, at least 50, 60, 70, 80 or 90% and up to 100% of the spaced apertures by area, a plurality of or all of the spaced apertures have an aperture width 0310 of 6 inches, or at least 4, 5, 6, 7, 8, 9, 10, 11 or 12 inches, or no more than 5, 6, 7, 8, 9, 10, 11, 12 or 13 inches, or any combination thereof, the aperture width 0310 of an aperture being measured in a direction that is perpendicular to the aperture length 0308 and being measured between two points on the frame 0104 that bound the aperture;
or
any combination thereof.

7. The inlet filter 0100 of any preceding clause:
the inlet filter 0100 (e.g., frame 0104, any component of the inlet filter 0100 or any combination of components of the inlet filter 0100 described in this disclosure) configured to fit completely in the storm sewer 0130 (e.g., storm sewer inlet 0102);
the inlet filter 0100 (e.g., frame 0104, any component of the inlet filter 0100 or any combination of components of the inlet filter 0100 described in this disclosure) configured so that it does not protrude from the storm sewer 0130 (e.g., storm sewer inlet 0102);
the inlet filter 0100 (e.g., frame 0104, any component of the inlet filter 0100 or any combination of components of the inlet filter 0100 described in this disclosure) configured so that it does not protrude outside the storm sewer 0130 (e.g., storm sewer inlet 0102) to a distance of more than 1, 2, 3, 4, 5, 6, 7, 8, 9, 10, 11 or 12 inches from the storm sewer inlet 0102;
or
any combination thereof.

8. The inlet filter 0100 of any preceding clause:
the inlet filter 0100 (e.g., the frame 0104) configured to retain floatable solid materials (e.g., solid materials too large to pass through apertures in the inlet filter 0100 (e.g. frame 0104)) that pass through the feed stream inlet 0106 and into the inner cavity 0120 of the inlet filter 0100;
the inlet filter 0100 (e.g., the frame 0104) configured to retain floatable solid materials (e.g., solid materials too large to pass through apertures in the inlet filter 0100 (e.g. frame 0104)) in the inner cavity 0120 of the inlet filter 0100;
the inlet filter 0100 configured to maintain the filter material 0202 in an operational configuration, optionally when the filter material 0202 is in the operational configuration, the filter material 0202 is positioned to filter a fluid passing through the frame 0104, positioned adjacent to the frame 0104, positioned on an inner surface of the frame 0104, positioned so that a fluid exiting the inner cavity 0120 of the frame 0104 under conditions that do not constitute an overflow condition will pass through the filter material 0202 before passing through at least one, a plurality of, or all of the apertures of the frame 0104, or any combination thereof;
the frame 0104 comprising spaced apertures, and at least one, at least 50, 60, 70, 80 or 90% and up to 100% of the spaced apertures by area, a plurality of or all of the spaced apertures have a cross-sectional open area of 9 square inches, or at least 6, 7, 8, 9, 10, 11, 12, or 13 square inches, no more than 7, 8, 9, 10, 11, 12, 13 or 14 square inches, or any combination thereof;
the frame 0104 comprising spaced apertures, and at least one, at least 50, 60, 70, 80 or 90% and up to 100% of the spaced apertures by area, a plurality of or all of the spaced apertures have an aperture length 0308 of 3 inches, or at least 1, 2, 3, 4, or 5 inches, or no more than 2, 3, 4, 5 or 6 inches, or any combination thereof, the aperture length 0308 of an aperture being the longest distance between any two points on the frame 0104 that bound the aperture;
the frame 0104 comprising spaced apertures, and at least one, at least 50, 60, 70, 80 or 90% and up to 100% of the spaced apertures by area, a plurality of or all of the spaced apertures have an aperture width 0310 of 3 inches, or at least 1, 2, 3, 4, or 5 inches, or no more than 2, 3, 4, 5 or 6 inches, or any combination thereof, the aperture width 0310 of an aperture being measured in a direction that is perpendicular to the aperture length 0308 and being measured between two points on the frame 0104 that bound the aperture;
or
any combination thereof.

9. The inlet filter 0100 of any preceding clause:
the inlet filter 0100 comprising a filter cartridge 0134 configured to hold or retain the filter material 0202 (e.g., in an operational configuration relative to the inlet filter 0100);
the filter cartridge 0134 being configured to be inserted and removed from the inlet filter 0100;
the filter cartridge 0134 being configured to be opened to permit access to the filter material 0202 held by the filter cartridge 0134, to permit the filter material 0202 to be removed, to permit the filter material 0202 to be replaced, or any combination thereof;
the filter cartridge 0134 being configured to be closed to retain the filter material 0202 or replacement filter material 0202 in a desired operational position or configuration with respect to the inlet filter 0100;
the filter cartridge 0134 configured (e.g., positioned and oriented with respect to the inlet filter 0100) so that the filter cartridge 0134 can be opened, closed, inserted, removed, replaced or any combination thereof by a user 0136 through the feed stream inlet 0106 of the inlet filter 0100, optionally without needing to open a manhole, optionally without needing to remove the inlet filter 0100 from the storm sewer inlet 0102;
the filter cartridge 0134 configured (e.g., positioned and oriented with respect to the inlet filter 0100) so that the filter cartridge 0134 can be opened by a user 0136 through the storm sewer inlet 0102, optionally without needing to open a manhole, optionally without needing to remove the inlet filter 0100 from the storm sewer inlet 0102;
the filter cartridge 0134 configured (e.g., positioned and oriented with respect to the inlet filter 0100) so that the filter cartridge 0134 is located adjacent to the feed stream inlet 0106 of the inlet filter 0100;
the filter cartridge 0134 configured (e.g., positioned and oriented with respect to the inlet filter 0100) so that the filter cartridge 0134, a filter material 0202 held or retained by the filter cartridge 0134, or any combination thereof can be installed, removed, replaced or any combination thereof (e.g., for use with the inlet filter 0100) by a user 0136 (e.g., through the feed stream inlet 0106 of the inlet filter 0100, through the sewer inlet or any combination thereof), optionally while the inlet filter 0100 is positioned in an operational configuration (e.g., configuration in which the inlet filter 0100 could operate if the filter were operably installed to filter the feed stream 0108), at least partially in a storm sewer inlet 0102, fully in a storm sewer inlet 0102, installed in the storm sewer inlet 0102 or a combination thereof;
the inlet filter 0100 comprising a filter cartridge 0134 configured to retain the filter material 0202, the filter cartridge configured so that the filter material can be replaced by a user after removing the filter cartridge from an aperture 1304 in a side (e.g., either side) of the inlet filter;
the inlet filter 0100 comprising a filter cartridge 0134 configured to retain the filter material 0202, the filter cartridge 0134 configured so that the filter material 0202 can be replaced by a user 0136 through the storm sewer inlet 0102 while the inlet filter 0100 is installed in the storm sewer inlet 0102;
the filter cartridge 0134 configured (e.g., positioned and oriented with respect to the inlet filter 0100) so that the filter cartridge 0134 can be removed from the inlet filter 0100 by a user 0136 through the storm sewer inlet 0102, optionally without needing to open a manhole, optionally without needing to remove the inlet filter 0100 from the storm sewer inlet 0102;

the filter cartridge 0134 configured (e.g., positioned and oriented with respect to the inlet filter 0100) so that the filter cartridge 0134 can be installed in the inlet filter 0100 by a user 0136 through the storm sewer inlet 0102, optionally without needing to open a manhole, optionally without needing to remove the inlet filter 0100 from the storm sewer inlet 0102;

or any combination thereof.

10. The inlet filter 0100 of any preceding clause:

the inlet filter 0100 comprising a lock 0132;

the lock 0132 configured to prevent removal of the inlet filter 0100 from the storm sewer inlet 0102 while the lock 0132 is in a locked configuration;

the lock 0132 configured to permit removal of the inlet filter 0100 from the storm sewer inlet 0102 while the lock 0132 is in an unlocked configuration;

the lock 0132 is configured to be coupled (e.g., permanently coupled, reversibly coupled, or removably coupled) to the inlet filter 0100 (e.g., the frame 0104 of the inlet filter 0100);

the lock 0132 comprises at least one protrusion, the at least one protrusion protruding past the frame 0104 when the lock 0132 is in a locked configuration, the at least one protrusion not protruding past the frame 0104 when the lock 0132 is in an unlocked configuration, the at least one protrusion being rotatable relative to the frame 0104, the at least one protrusion configured to protrude beyond the frame 0104, the at least one protrusion configured to be retracted so that the at least one protrusion does not protrude beyond the frame 0104, or any combination thereof;

or any combination thereof.

11. The inlet filter 0100 of any preceding clause:

the frame 0104 comprising, consisting essentially of, or consisting of metal, metal alloy, wire, or any combination thereof (e.g., metal wire) that has been bent into a wedge shape and optionally opposite ends of the wire have been coupled together;

the frame 0104 comprising, consisting essentially of, or consisting of a polymer (e.g., plastic, thermoplastic, rubber, a polymer material that can be molded into the form of the frame 0104, or any combination thereof);

the frame 0104 comprising, consisting essentially of, or consisting of any material that has a flexibility, rigidity, ductility, yield strength, compressive strength, tensile strength or any combination thereof so that when the frame 0104 is wedged into a storm sewer inlet 0102 and compressed between opposite inner surfaces of the storm sewer inlet 0102, the frame 0104 will remain in an operative, orientation or combination thereof (e.g., in the storm sewer inlet 0102) during expected operational conditions, during expected design conditions, during regulatorily specified conditions, against a specified velocity of water, or any combination thereof;

the frame 0104 comprising, consisting essentially of, or consisting of any material that has a flexibility, rigidity, ductility, yield strength, compressive strength, tensile strength or any combination thereof so that when the frame 0104 is wedged into a storm sewer inlet 0102 and compressed between opposite inner surfaces of the storm sewer inlet 0102, the frame 0104 will remain in an operative, orientation or combination thereof (e.g., in the storm sewer inlet 0102) as water enters the storm sewer inlet 0102 at a velocity corresponding to the velocity of water entering the storm sewer 0130 during a flood event in which an elevation of the flood water corresponds to the elevation of flood water during a 5 year, 10 year, 25 year, 100 year, 500 year, or 1000 year flood as calculated by applicable regulations for the location of the storm sewer 0130 at the time that the inlet filter 0100 is installed;

the inlet filter 0100 (e.g., frame 0104) configured so that when the inlet filter 0100 (e.g., frame 0104) is wedged into a storm sewer inlet 0102 and compressed between opposite inner surfaces of the storm sewer inlet 0102, the inlet filter 0100 (e.g., frame 0104) will remain in an operative, orientation or combination thereof (e.g., in the storm sewer inlet 0102) during expected operational conditions, during expected design conditions, during regulatorily specified conditions, against a specified velocity of water, while operating to filter a feed stream 0108 (e.g., comprising water and solid materials) entering the storm sewer inlet 0102 (e.g., as a result of rain or flooding), while operating to filter a feed stream 0108 (e.g., water and solid materials) entering the feed stream inlet 0106 of the inlet filter 0100 (e.g., as a result of rain or flooding), or any combination thereof;

or any combination thereof.

12. The inlet filter 0100 of any preceding clause:

the filter material 0202 comprising a material configured to filter a feed stream 0108 entering the inlet filter 0100, the filter material 0202 retaining solid materials in the feed stream 0108 to provide a retentate 0138, the filter material 0202 passing fluid in the feed stream 0108 to provide a filtrate, the inlet filter 0100 configured to discharge the filtrate to the storm sewer 0130;

the filter material 0202 comprising a fabric;

the filter material 0202 comprising a filter material 0202 (e.g. non-woven geotextile fabric);

optionally the filter material 0202 (e.g. non-woven geotextile fabric) having a weight per area equal to 3.1 to 3.5 ounces per square yard (e.g., as measured according to ASTM D5261—10(2018));

optionally the filter material 0202 (e.g. non-woven geotextile fabric) having a weight per area equal to at least 1.5, 2.0, 2.5, 3.0, 3.1, 3.2, 3.3, 3.4, or 3.5 ounces per square yard, no more than 2.0, 2.5, 3.0, 3.1, 3.2, 3.3, 3.4, 3.5, 4.0, 4.5, 5.0 ounces per square yard, or any combination thereof as measured according to ASTM D5261—10(2018);

optionally the filter material 0202 (e.g. non-woven geotextile fabric) having an apparent opening size (AOS) equivalent to or greater than the apparent opening size of a #50 US sieve filter material 0202 (or equivalent or greater than approximately 0.297 mm apparent opening size) as measured according to ASTM D4751—20 (e.g., a #45 US sieve filter or #40 US sieve filter or any US sieve # smaller than #50 has a greater apparent opening size than a #50 US sieve filter);

optionally the filter material 0202 (e.g. non-woven geotextile fabric) having an apparent opening size (AOS) equal to at least the apparent opening size of a #60, #50, #45, or #40 US sieve filter material 0202 (or at least 0.250, 0.297, 0.354 or 0.400 mm), no more than the apparent opening size of a #50, #45, #40 or #35 US sieve filter material 0202 (or no more than 0.297, 0.354, 0.400 or 0.500 mm), or any combination thereof as measured according to ASTM D4751—20 (e.g., a #45 US sieve filter or #40 US sieve filter or any US sieve # smaller than #50 has a greater apparent opening size than a #50 US sieve filter);

optionally the filter material 0202 (e.g. non-woven geotextile fabric) having a water flow rate equal to or greater than 150 gpm/ft^2 (or 6095 lb/min/m^2) as measured according to ASTM D4491/D4491M—17;

optionally the filter material 0202 (e.g. non-woven geotextile fabric) having a water flow rate equal to at least 100, 110, 120, 130, 140, 150, 155, 160, 170, 180, 190, 200, 210, 225, 250, 275, 300, 325, 350, 375 or 400 gpm/ft^2, no more than 110, 120, 130, 140, 150, 155, 160, 170, 180, 190, 200, 210, 225, 250, 275, 300, 325, 350, 375, 400 or 425 gpm/ft^2, or any combination thereof, as measured according to ASTM D4491/D4491M—17;

the filter material 0202 comprising a monofilament fabric;

or any combination thereof.

13. Any inlet filter disclosed in this disclosure, or the inlet filter of any preceding clause:

the inlet filter comprising any component disclosed in this disclosure, any combination of components disclosed in this disclosure, any portion of a component disclosed in this disclosure, any combination of portions of a component disclosed in this disclosure, any combination of portions of components disclosed in this disclosure, or any combination thereof;

the inlet filter comprising any component disclosed in this disclosure, any combination of components disclosed in this disclosure, any portion of a component disclosed in this disclosure, any combination of portions of a component disclosed in this disclosure, any combination of portions of components disclosed in this disclosure, or any combination thereof; optionally the inlet filter comprising any component disclosed in this disclosure, any combination of components disclosed in this disclosure, any portion of a component disclosed in this disclosure, any combination of portions of a component disclosed in this disclosure, any combination of portions of components disclosed in this disclosure, or any combination thereof is configured to have any configuration disclosed in this disclosure;

or any combination thereof.

14. A method 0900, the method comprising:

inserting 0902 at least one inlet filter 0100 (e.g., an inlet filter, one and only one inlet filter, a plurality of inlet filters comprising the inlet filter, the inlet filter of any preceding clause, or any combination thereof) into a storm sewer inlet 0102;

optionally the at least one inlet filter comprising an inlet filter that is one of a plurality of inlet filters inserted into the storm sewer inlet (e.g., overlapping, adjacent to each other, side-by-side, coupled to each other, connected, fixed to each other, with a narrow portion of the inlet filters inserted into the storm sewer inlet and the thick portion being too thick to pass through (e.g., partially through or completely through) the storm sewer inlet; or any combination thereof) the filters cooperating to filter a feed stream entering the storm sewer inlet;

using 0904 the at least one inlet filter 0100 to filter a feed stream entering the storm sewer inlet 0102;

or any combination thereof.

15. A method 0900 of using at least one inlet filter 0100 (e.g., an inlet filter, one and only one inlet filter, a plurality of inlet filters comprising the inlet filter, the inlet filter of any preceding clause, any portion of an inlet filter, any combination of portions of an inlet filter, or any combination thereof), the method comprising:

inserting 0902 the inlet filter 0100 into a storm sewer inlet 0102;

inserting 0902 an additional inlet filter 0100 into the storm sewer inlet 0102;

removing the inlet filter 0100 from the storm sewer inlet 0102;

locking a lock 0132 of the inlet filter 0100 so that the inlet filter 0100 cannot be removed from the storm sewer inlet 0102;

removing a filter cartridge (e.g., the filter cartridge) from the inlet filter 0100 comprising or retaining a filter material 0202, the filter material 0202 configured to filter a feed stream 0108 that flows into the inlet filter 0100;

installing a replacement filter cartridge into an operable configuration relative to the inlet filter 0100, the replacement filter cartridge comprising or retaining a replacement filter material 0202, the replacement filter material 0202 configured to filter a feed stream 0108 that flows into the inlet filter 0100;

replacing a filter cartridge comprising or retaining a filter material 0202, the filter material 0202 used to filter a feed stream 0108 that flows into the inlet filter 0100;

replacing a filter material 0202, the filter material 0202 used to filter a feed stream 0108 that flows into the inlet filter 0100;

opening a filter cartridge (e.g., the filter cartridge) of the inlet filter 0100; installing a filter material 0202 (e.g., the filter material 0202) in the filter cartridge; replacing a filter material 0202 (e.g., the filter material 0202) in the filter cartridge; removing a filter material 0202 (e.g., the filter material 0202) from the filter cartridge; installing a replacement filter material 0202 (e.g., in the filter cartridge); the filter material 0202 configured to filter a feed stream 0108 that flows into the inlet filter 0100; the opening the filter cartridge, the installing the filter material 0202, the replacing the filter material 0202, the installing the replacement filter material 0202, or any combination thereof being performed by a user 0136 through the storm sewer inlet 0102, through the feed stream inlet 0106 of the inlet filter 0100, from a position in front of a curb where the storm sewer inlet 0102 is located, without opening or entering a manhole for the storm sewer 0130 comprising the storm sewer inlet 0102, or any combination thereof; the filter cartridge comprising or retaining a filter material 0202; or any combination thereof;

removing a filter material 0202 (e.g., the filter material 0202) from the inlet filter 0100, the filter material 0202 configured to filter a feed stream 0108 that flows into the inlet filter 0100;

installing a replacement filter material 0202 into an operable configuration relative to the inlet filter 0100 comprising a replacement filter material 0202, the replacement filter material 0202 configured to filter a feed stream 0108 that flows into the inlet filter 0100;

unlocking a lock 0132 (e.g., the lock 0132) of the inlet filter 0100 so that the inlet filter 0100 can be removed from the storm sewer inlet 0102;

using 0904 the inlet filter 0100 for filtering a feed stream 0108 entering the storm sewer inlet 0102;

or any combination thereof.

16. The method of any preceding clause:

the filtering comprising:

using the feed stream inlet 0106 to receive the feed stream 0108 comprising a fluid (e.g., water) and solid materials carried by the fluid;

using the filter material 0202 to filter the feed stream 0108, thereby providing a filtrate stream 0126 comprising fluid and solid materials that can pass through the filter material 0202 and a retentate 0138 comprising solid materials that cannot pass through the filter material 0202;

discharging the filtrate stream 0126 comprising at least a portion of the fluid in the feed stream 0108 and at least a portion of any solid materials that are not retained by the inlet filter 0100;

retaining solid materials in the retentate 0138 in the inner cavity 0120 of the inlet filter 0100;

the inlet filter 0100 configured so that during an overflow condition wherein the top of the feed stream 0108 is at an elevation above the top 0128 of the filter material 0202, the inlet filter 0100 discharges a portion of the feed stream 0108 at an elevation above the top 0128 of the filter material 0202 through at least one aperture 0304 in the inlet filter 0100, optionally the at least one aperture 0304 configured to pass smaller objects in the solid materials and retain larger objects in the solid materials;

optionally, during an overflow condition wherein the top of the feed stream 0108 is at an elevation above the top 0128 of the filter material 0202, discharging a portion of the feed stream 0108 at an elevation above the top 0128 of the filter material 0202 through at least one aperture 0304 (e.g., a plurality of apertures) in the inlet filter 0100 (e.g., the frame 0104 of the inlet filter 0100), optionally the at least one aperture 0304 configured to pass smaller objects in the solid materials and retain larger objects in the solid materials;

or any combination thereof.

17. The method of any preceding clause:

the method comprising inserting a plurality of inlet filters 0100 into the storm sewer inlet 0102, the step of inserting the plurality of inlet filters into the storm sewer comprising the step of inserting the inlet filter 0100 into a storm sewer inlet 0102, the plurality of inlet filters 0100 comprising the inlet filter 0100 and at least one additional inlet filter 0100, each of the at least one additional inlet filters 0100 comprising corresponding components that correspond to the components of the inlet filter 0100;

optionally the corresponding components configured as the components of the inlet filter 0100 are configured;

optionally the corresponding components configured analogously to the components of the inlet filter 0100;

optionally each of the plurality of inlet filters 0100 are configured to be joined (e.g., overlapped, fastened together, positioned adjacently, or any combination thereof) to filter a feed stream 0108 that enters the storm sewer inlet 0102, thereby providing a filtered stream and discharge the filtered stream to the storm sewer 0130 comprising the storm sewer inlet 0102;

optionally each of the plurality of inlet filters 0100 are configured to be joined (e.g., overlapped, fastened together, positioned adjacently, or any combination thereof) to function as a single inlet filter 0100 (e.g., a single continuous inlet filter 0100) for the storm sewer inlet 0102;

optionally each of the plurality of inlet filters 0100 are configured to be joined (e.g., overlapped, fastened together, positioned adjacently, or any combination thereof) to filter at least a portion (e.g., at least 1, 2, 3, 4, 5, 6, 7, 8, 9, 10, 20, 30, 40, 50, 60, 70, 80, 90, 91, 92, 93, 94, 95, 96, 97, 98, 99 or 99% by mass or volumetric flow rate) of a feed stream 0108 entering the storm sewer inlet 0102 if the level of the feed stream 0108 is lower than an overflow outlet 0302 of each of the plurality of inlet filters 0100;

or any combination thereof.

18. The method of any preceding clause:

the inlet filter 0100 or any inlet filter 0100 being the inlet filter 0100 of any preceding clause or any filter described in this disclosure.

19. The inlet filter 0100 of any preceding clause:

the inlet filter 0100, any component of the inlet filter 0100, any combination of components of the inlet filter 0100, or any combination thereof being configured to perform the method, any step of the method, any combination of steps of the method, any portion of a step of the method, or any combination of portions of any step or steps of the method described in any preceding clause or in this disclosure.

Although the invention has been described above and in the drawings using an inlet filter having a frame that is generally the shape of a triangular prism, the frame is not limited to this shape. For example, other wedge shapes can also be used. Moreover, the frame can have various shapes that are thick at one end taper to a narrower opposite end. Additionally, although the top and bottom exterior surfaces of the wedge that engage a storm sewer inlet can be planar, they can also be curved, rounded, convex, concave, or any combination thereof.

Additionally, although the frame need not be shaped exactly like a rectangular prism, providing the frame with the shape of rectangular prism shape can facilitate insertion of the inlet filter into a storm sewer inlet and retention of the inlet filter in the storm sewer inlet. For example, without being bound by theory, if the top exterior surface and bottom exterior surface of the frame are generally planar, as the inlet filter is inserted into the storm sewer inlet and against top and bottom interior surfaces of the storm sewer inlet, respectively, the top and bottom exterior surfaces of the frame can be flexed inwardly as the inlet filter is compressed by being pushed against the top and bottom interior surfaces of the storm sewer inlet. Furthermore, as the top and bottom exterior surface of the frame are flexed inwardly, they will exert a force against the top and bottom interior surfaces of the storm sewer inlet, and this force can increase the frictional force that must be overcome to extract the inlet filter from between storm sewer inlet. Meanwhile, a stream of fluid rushing into the storm sewer inlet and the inlet filter will be unable to push the inlet filter into the storm sewer because the thicker end of the wedge is too thick to pass through the storm sewer inlet.

Although embodiments of the invention have been described using the word "comprising," additional embodiments can be created by replacing the word "comprising" with "consisting essentially of" or "consisting of"

Additionally, the phrase "consisting essentially of" can be replaced by the term "comprising" or "consisting of" to form additional embodiments.

Furthermore, the phrase "consisting of" can be replaced by the term "comprising" or "consisting essentially of" to form additional embodiments.

Although embodiments of the invention have been described using a first range with a first set of end points, additional embodiments can be created by replacing the first range with a narrower range whose endpoints are selected from any value contained in the first range.

Although embodiment of the invention have been described using a specific direction relative to a reference direction, additional embodiments can be created by indicating that the specific direction can vary from the reference direction by no more than 45, 40, 35, 30, 25, 20, 15, 10, 5, 4, 3, 2 or 1 degrees.

Although embodiments of the invention have been described using the phrase "at least a portion" or "a portion," in additional embodiments, any of these phrases can be replaced by at least 1, 2, 3, 4, 5, 6, 7, 8, 9, 10, 20, 30, 40, 50, 60, 70, 80, 90, 91, 92, 93, 94, 95, 96, 97, 98 or 99 and up to 100% by number, length, width, thickness, cross-sectional area, surface area, volume, weight, mass flow rate or volumetric flow rate of an item, items, a substance, substances, a characteristic, or characteristics to which the phrase "at least a portion" or "a portion" are referring. For example, "at least a portion of the fluid" can be replaced with "at least 50% by mass flow rate of the fluid" or "at least 90% and up to 100% by volumetric flow rate of the fluid."

Although embodiments of the invention have been described with respect to a value, a lower end point of a range, an upper endpoint of a range, or any combination thereof, in additional embodiments, the value, the lower end point of the range, the upper endpoint of the range, or any combination thereof can be replaced by a replacement value that is 0.5, 0.6, 0.7, 0.8, 0.9, 1.0, 1.1, 1.2, 1.3, 1.4 or 1.5 times the value, the lower endpoint of the range or the upper endpoint of the range expressly described in the application. For example, if a value of 1 is described in the application, in additional embodiments, the value can be replaced by a range from 0.5 to 1.5. As another example, if a range from 1 to 10 is described in the application, in additional embodiments, the range can be replaced by a range from 0.5 to 15, a range from 0.5 to 5, a range from 1.5 to 5, or a range from 1.5 to 15.

Although embodiments have been described with reference to numbers (e.g., first, second, third, fourth, fifth, sixth, etc.), the numbers are generally nominal numbers, unless otherwise specified expressly or by context. In other words, the numbers are used for naming purposes to distinguish from another item, without reference to order or even total number. Nonetheless, in some embodiments, any number can be deemed a cardinal number that specifies the number of items referenced. Furthermore, in some embodiments, any number can be deemed an ordinal number that specifies the order of an item among other items. In some embodiments, any number can be deemed as a nominal number, a cardinal number, an ordinal number or any combination thereof.

Although embodiments of methods have been described with steps in a specific order, additional embodiments can be provided in which any listed steps occur simultaneously, or in a different order that is provided by substituting the position of one step for the position of another step. Additionally, although embodiments of methods have been described with specific combinations of steps, in additional embodiments, any step or any combination of steps can be omitted from the method, any step described in this disclosure can be added to the method, or any combination thereof.

Although embodiments of the invention have been described with reference to materials or classes of materials, for example, polymers, metals or metal alloys, additional embodiments can be formed in which the inlet filter, any component of the inlet filter, or any combination of components of the inlet filter comprise, consist essentially of, consist of, or are made using any material (e.g., metal, metal alloy, steel, stainless steel, aluminum, polymer, rubber, plastic, thermoplastic, ceramic material, fiber, wood, rope, cable, wire or any combination thereof) that is capable of performing at least one of, any combination of, or all of the functions described or implied in this disclosure for the inlet filter, the component of the inlet filter, or the combination of components of the inlet filter.

Examples of an inlet filter being in a storm sewer inlet include, but are not limited to, the inlet filter being at least partially in the storm sewer inlet, the inlet filter being partially in the storm sewer inlet, the inlet filter being completely in the storm sewer inlet except for a protruding portion of the inlet filter that protrudes from the storm sewer inlet by 0 to no more than 1, 2, 3, 4, 5, 6, 7, 8, 9, 10, 11 or 12 inches, the inlet filter being completely in the storm sewer inlet, or any combination thereof. Additionally, for any embodiment in which an inlet filter, component of an inlet filter, or combination of a components of an inlet filter is described as being in the storm sewer or storm sewer inlet, additional embodiments can be formed in which the inlet filter, component of the inlet filter, or combination of the components of the inlet filter is at least partially in the storm sewer inlet, is partially in the storm sewer inlet, is completely in the storm sewer inlet except for a protruding portion of the inlet filter that protrudes from the storm sewer inlet by 0 to no more than 1, 2, 3, 4, 5, 6, 7, 8, 9, 10, 11 or 12 inches, is completely in the storm sewer inlet, or any combination thereof. Additionally, for any embodiment in which an inlet filter, component of an inlet filter, or combination of a components of an inlet filter is described as being in the storm sewer inlet, additional embodiments can be formed in which another of the inlet filter, component of the inlet filter, or combination of the components of the inlet filter is in the storm sewer. Furthermore, for any embodiment in which an inlet filter, component of an inlet filter, or combination of a components of an inlet filter is described as being in the storm sewer, additional embodiments can be formed in which another of the inlet filter, component of the inlet filter, or combination of the components of the inlet filter in the storm sewer inlet.

Although embodiments have been described in which a first element or plurality of elements is smaller than a second element or plurality of elements, in additional embodiments, the first element or plurality of elements can be smaller by length, width, area, in terms of the size of the diameter of a spherical particle that can pass through the first element or plurality of elements versus the second element or plurality of elements, by volume, by mass or any combination thereof. Additionally, at least 1, 2, 3, 4, 5, 6, 7, 8, 9, 10, 20, 30, 40, 50, 60, 70, 80, 90, 91, 92, 93, 94, 95, 96, 97, 98, 99 or 100% of the first plurality of elements by area, mass, volume, number or any combination thereof; no more than 2, 3, 4, 5, 6, 7, 8, 9, 10, 20, 30, 40, 50, 60, 70, 80, 90, 91, 92, 93, 94, 95, 96, 97, 98, 99 or 100% of the first plurality of elements by area, mass, volume, number or any combination thereof; or any combination thereof can be smaller than the average size of the second plurality of elements by area, mass, volume, number, or any combination thereof.

Although embodiments have been described in which a first element or plurality of elements is larger than a second element or plurality of elements, in additional embodiments, the first element or plurality of elements can be larger by length, width, area, in terms of the size of the diameter of a spherical particle that can pass through the first element or plurality of elements versus the second element or plurality of elements, by volume, by mass or any combination thereof. Additionally, at least 1, 2, 3, 4, 5, 6, 7, 8, 9, 10, 20, 30, 40, 50, 60, 70, 80, 90, 91, 92, 93, 94, 95, 96, 97, 98, 99 or 100% of the first plurality of elements by area, mass, volume, number or any combination thereof; no more than 2, 3, 4, 5, 6, 7, 8, 9, 10, 20, 30, 40, 50, 60, 70, 80, 90, 91, 92, 93, 94, 95, 96, 97, 98, 99 or 100% of the first plurality of elements by area, mass, volume, number or any combination thereof; or any combination thereof can be larger than the average size of the second plurality of elements by area, mass, volume, number, or any combination thereof.

Although the invention hereof has been described by way of preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An inlet filter for a storm sewer inlet, the inlet filter comprising:
a frame comprising a fed stream inlet and a filtrate outlet; and
filter material;
the feed stream inlet configured to receive a feed stream, the feed stream inlet comprising a plurality of apertures, the feed stream comprising a fluid and solid materials carried by the fluid into the inlet filter;
the filtrate outlet configured to discharge a filtrate stream comprising at least a portion of the fluid in the feed stream that passes through the filter material and any solid materials that pass through the filter material;
the frame being configured so that an exterior of the frame is shaped like a wedge, the frame comprising a thick portion configured so that it is too thick to pass through a reference rectangle and the frame comprising a narrow portion opposite the thick portion, the narrow portion configured so that it is thin enough to be inserted into the reference rectangle; and
the thick portion of the frame comprising the feed stream inlet.

2. The inlet filter of claim 1, the frame being configured to form an inner cavity within the frame, the inlet filter configured to retain floatable solid materials in the inner cavity.

3. The inlet filter of claim 1, the inlet filter comprising an overflow outlet, the overflow outlet configured to allow an elevated portion of the feed stream to be discharged from the inlet filter without passing through the filter material, the elevated portion of the feed stream comprising a portion of the feed stream at an elevation higher than the elevation of the top of the filter material.

4. The inlet filter of claim 1, the frame comprising spaced apertures comprising the plurality of apertures of the feed stream inlet, the inlet filter comprising an object retention structure having spaced apertures, the object retention structure configured to retain floatable materials that enter the inlet filter, and wherein at least 50% and up to 100% by area of the spaced apertures of the object retention structure are smaller than an average size by area of the spaced apertures of the frame.

5. The inlet filter of claim 1, the inlet filter being configured so that the filter material can be removed from the inlet filter and replaced with a replacement filter material.

6. The inlet filter of claim 1, the exterior of the inlet filter is configured so that an angle between a top exterior surface of the inlet filter and a bottom exterior surface of the inlet filter is from 15 to 45 degrees.

7. The inlet filter of claim 1, the frame comprising spaced apertures comprising the plurality of apertures of the feed stream inlet, and at least 50% and up to 100% by area of the spaced apertures of the frame have an aperture length and an aperture width equal to 6 to 8 inches, the aperture length of an aperture being the longest distance between any two points on the frame that bound the aperture, and the aperture width of the aperture being measured in a direction that is perpendicular to the aperture length and being measured between two points on the frame that bound the aperture.

8. The inlet filter of claim 7, the inlet filter comprising an object retention structure, the object retention structure configured to retain floatable materials that (i) enter the inlet filter and (ii) can pass through the spaced apertures in the frame.

9. The inlet filter of claim 1, the frame comprising spaced apertures comprising the plurality of apertures of the feed stream inlet, and at least 50% and up to 100% by area of the spaced apertures have an aperture length and an aperture width equal to 1 to 5 inches, the aperture length of an aperture being the longest distance between any two points on the frame that bound the aperture, and the aperture width being measured in a direction that is perpendicular to the aperture length and being measured between two points on the frame that bound the aperture.

10. The inlet filter of claim 1, the inlet filter comprising a filter cartridge configured to retain the filter material, the filter cartridge configured so that the filter material can be replaced by a user after removing the filter cartridge from an aperture in a side of the inlet filter.

11. The inlet filter of claim 1, the inlet filter comprising a filter cartridge configured to retain the filter material, the filter cartridge configured so that the filter material can be replaced by a user through the storm sewer inlet while the inlet filter is installed in the storm sewer inlet.

12. The inlet filter of claim 1, the inlet filter comprising a lock, the lock configured to prevent removal of the inlet filter from the storm sewer inlet while the lock is in a locked configuration.

13. The inlet filter of claim 1, the inlet filter configured so that the inlet filter remains in an operative location at least partially in the storm sewer inlet while operating to filter the feed stream entering the storm sewer inlet.

14. The inlet filter of claim 1, the filter material comprising a non-woven geotextile fabric.

15. The inlet filter of claim 1, the filter material being positioned along a bottom surface of the frame and a portion of an upper surface of the frame, the portion of the upper surface of the frame being positioned in the narrow portion of the frame and adjacent to an insertion end of the frame, the insertion end of the frame being opposite the feed stream inlet.

16. The inlet filter of claim 1, the plurality of apertures of the feed stream inlet configured to pass smaller solid objects and retain larger solid objects.

17. The inlet filter of claim 16, the frame being configured so that the exterior of the frame is shaped like a triangular prism;
the triangular prism having a front surface providing at least a part of the thick portion of the frame, a top surface coupled to the front surface, and a bottom surface coupled to the front surface and the top surface;
the top surface and the bottom surface extending from the thick portion of the frame to the narrow portion of the frame;
the front surface comprising the feed stream inlet and the plurality of apertures in the feed stream inlet.

18. The inlet filter of claim 17, the triangular prism comprising:
a first side aperture bounded by the front surface, the top surface, and the bottom surface; and
a second side aperture opposite the first side aperture, the second side aperture being bounded by the front surface the top surface and the bottom surface.

19. The inlet filter of claim 17, the frame being configured to be retained by opposite inner surfaces of the storm sewer inlet, and the inlet filter being configured so that only (i) the thick portion of the triangular-prism-shaped frame or (ii) a portion of the thick portion of the triangular-prism-shaped frame protrudes from the storm sewer inlet.

20. A method, the method comprising:
inserting an inlet filter into a storm sewer inlet;
the inlet filter comprising components of the inlet filter, the components of the inlet filter comprising:
a frame comprising a feed stream inlet and a filtrate outlet; and
filter material;
the feed stream inlet configured to receive a feed stream, the feed stream inlet comprising a plurality of apertures, the feed stream comprising a fluid and solid materials carried by the fluid into the inlet filter;
the filtrate outlet configured to discharge at least a portion of a filtrate stream comprising fluid from the feed stream that passes through the filter material and any solid materials that pass through the filter material;
the frame being configured so that an exterior of the frame is shaped like a wedge, the frame comprising a thick portion configured so that it is too thick to pass through a reference rectangle and the frame comprising a narrow portion opposite the thick portion, the narrow portion configured so that it is thin enough to be inserted into the reference rectangle; and
the thick portion of the frame comprising the feed stream inlet.

21. The method of claim 20, the method comprising inserting a plurality of inlet filters into the storm sewer inlet, the step of inserting the plurality of inlet filters into the storm sewer inlet comprising the step of inserting the inlet filter into the storm sewer inlet:
the plurality of inlet filters comprising the inlet filter and at least one additional inlet filter;
each of the at least one additional inlet filter comprising corresponding components that correspond to the components of the inlet filter.

22. The method of claim 20, the inlet filter comprising a lock, the method comprising:
locking the lock of the inlet filter so that the inlet filter cannot be removed from the storm sewer inlet.

23. The method of claim 22, the method comprising:
unlocking the lock of the inlet filter so that the inlet filter can be removed from the storm sewer inlet.

24. The method of claim 20, the inlet filter comprising a filter cartridge, the filter cartridge retaining the filter material, the method comprising:
opening the filter cartridge of the inlet filter; and
replacing the filter material through the storm sewer inlet.

25. The method of claim 20, the method comprising:
using the inlet filter for filtering the feed stream entering the storm sewer inlet, the filtering comprising:
using the feed stream inlet to receive the feed stream comprising the fluid and the solid materials carried by the fluid;
using the filter material to filter the feed stream, thereby providing the filtrate stream comprising the fluid and the solid materials that can pass through the filter material and a retentate comprising solid materials that cannot pass through the filter material;
discharging the filtrate stream;
retaining solid materials in the retentate in an inner cavity of the inlet filter;
the inlet filter configured so that during an overflow condition wherein the top of the feed stream is at an elevation above the top of the filter material, the inlet filter discharges an elevated portion of the feed stream through at least one discharge aperture in the inlet filter, the elevated portion of the feed stream comprising a portion of the feed stream at an elevation higher than the elevation of the top of the filter material, the at least one discharge aperture configured to pass smaller objects in the solid materials and retain larger objects in the solid materials.

26. The method of claim 20, the filter material being positioned along a bottom surface of the frame and a portion of an upper surface of the frame, the portion of the upper surface of the frame being positioned in the narrow portion of the frame and adjacent to an insertion end of the frame, the insertion end of the frame being opposite the feed stream inlet.

27. A system comprising a first inlet filter for the storm sewer inlet according to claim 1 and a second inlet filter for the storm sewer inlet according to claim 1; wherein the first inlet filter and the second inlet filter are configured to be capable of simultaneously (i) partially overlapping and (ii) cooperating to filter the feed stream to the storm sewer inlet.

28. The method of claim 20, the frame being configured so that the only portion of the frame that protrudes outside the storm sewer inlet is (i) the thick portion or (ii) a portion of the thick portion, the thick portion being shaped like a thick portion of a wedge.

29. The method of claim 20, the frame being configured to be retained in the storm sewer inlet solely by (i) compression of the frame between top and bottom surfaces of the storm sewer inlet, (ii) friction between the frame and the top and bottom surfaces of the storm sewer, and (iii) the thick portion of the frame being too thick to pass through the storm sewer inlet, the thick portion of the frame being shaped like a thick portion of a wedge.

* * * * *